US009424400B1

(12) United States Patent
Blankenbeckler et al.

(10) Patent No.: US 9,424,400 B1
(45) Date of Patent: *Aug. 23, 2016

(54) DIGITAL RIGHTS MANAGEMENT SYSTEM TRANSFER OF CONTENT AND DISTRIBUTION

(71) Applicant: Western Digital Technologies, Inc., Irvine, CA (US)

(72) Inventors: David L. Blankenbeckler, Longmont, CO (US); Danny O. Ybarra, Mission Viejo, CA (US); Lambertus Hesselink, Portola Valley, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/571,178

(22) Filed: Dec. 15, 2014

Related U.S. Application Data

(63) Continuation of application No. 13/460,805, filed on Apr. 30, 2012, now Pat. No. 8,914,634.

(60) Provisional application No. 61/622,312, filed on Apr. 10, 2012, provisional application No. 61/636,460, filed on Apr. 20, 2012.

(51) Int. Cl.
*H04L 9/32* (2006.01)
*G06F 21/10* (2013.01)

(52) U.S. Cl.
CPC ............... *G06F 21/10* (2013.01); *H04L 9/321* (2013.01); *G06F 2221/07* (2013.01)

(58) Field of Classification Search
None
See application file for complete search history.

(56) References Cited

U.S. PATENT DOCUMENTS

| 6,205,550 | B1 | 3/2001 | Nardone et al. |
| 6,499,054 | B1 | 12/2002 | Hesselink et al. |
| 6,609,199 | B1 | 8/2003 | DeTreville |
| 6,732,158 | B1 | 5/2004 | Hesselink et al. |
| 6,832,319 | B1 | 12/2004 | Bell et al. |
| 7,024,393 | B1 | 4/2006 | Peinado et al. |
| 7,120,692 | B2 | 10/2006 | Hesselink et al. |
| 7,155,616 | B1 | 12/2006 | Hamlin |
| 7,215,771 | B1 | 5/2007 | Hamlin |
| 7,356,143 | B2 | 4/2008 | Morten |
| 7,454,443 | B2 | 11/2008 | Ram et al. |

(Continued)

OTHER PUBLICATIONS

Office Action dated Oct. 29, 2013 from U.S. Appl. No. 13/460,766, 19 pages.

(Continued)

*Primary Examiner* — Brandon Hoffman

(57) ABSTRACT

The present invention relates to digital rights management (DRM) for content that may be downloaded and securely transferred from one storage to another storage. The storage may be a disk drive, or network attached storage. The storage performs cryptographic operations and provides a root of trust. The DRM system enables secure copying or transfer of content from one storage device to another storage device. In this embodiment, a trusted server that is authenticated and trusted by both storage devices brokers the transfer of content. The trusted server may be a separate entity of the DRM system or may be a component or function of an existing server of the DRM system. In another embodiment, the storage devices may transfer content in a peer-to-peer fashion. The transfer of content may be authorized and controlled based on a digital certificate associated with the content.

17 Claims, 14 Drawing Sheets

(56) References Cited

U.S. PATENT DOCUMENTS

| | | | |
|---|---|---|---|
| 7,467,187 B2 | 12/2008 | Hesselink et al. |
| 7,467,304 B2 | 12/2008 | Bar-El et al. |
| 7,546,353 B2 | 6/2009 | Hesselink et al. |
| 7,587,467 B2 | 9/2009 | Hesselink et al. |
| 7,594,275 B2 | 9/2009 | Zhu et al. |
| 7,600,036 B2 | 10/2009 | Hesselink et al. |
| 7,788,404 B2 | 8/2010 | Hesselink et al. |
| 7,917,628 B2 | 3/2011 | Hesselink et al. |
| 7,925,894 B2 | 4/2011 | Thibadeau |
| 7,934,251 B2 | 4/2011 | Hesselink et al. |
| 7,949,564 B1 | 5/2011 | Hughes et al. |
| 8,004,791 B2 | 8/2011 | Szeremeta et al. |
| 8,255,661 B2 | 8/2012 | Karr et al. |
| 8,285,965 B2 | 10/2012 | Karr et al. |
| 8,341,117 B2 | 12/2012 | Ram et al. |
| 8,341,275 B1 | 12/2012 | Hesselink et al. |
| 8,352,567 B2 | 1/2013 | Hesselink et al. |
| 8,526,798 B2 | 9/2013 | Hesselink |
| 8,631,284 B2 | 1/2014 | Stevens |
| 8,646,054 B1 | 2/2014 | Karr et al. |
| 8,661,507 B1 | 2/2014 | Hesselink et al. |
| 8,688,797 B2 | 4/2014 | Hesselink et al. |
| 8,713,265 B1 | 4/2014 | Rutledge |
| 8,762,682 B1 | 6/2014 | Stevens |
| 8,780,004 B1 | 7/2014 | Chin |
| 8,793,374 B2 | 7/2014 | Hesselink et al. |
| 8,819,443 B2 | 8/2014 | Lin |
| 8,831,217 B2 | 9/2014 | Blankenbeckler et al. |
| 8,831,218 B2 | 9/2014 | Blankenbeckler et al. |
| 8,914,634 B2 | 12/2014 | Blankenbeckler et al. |
| 2002/0168070 A1 | 11/2002 | Bernsen |
| 2004/0030650 A1 | 2/2004 | Okuyama et al. |
| 2005/0071032 A1 | 3/2005 | Urabe |
| 2005/0144195 A1 | 6/2005 | Hesselink et al. |
| 2005/0144200 A1 | 6/2005 | Hesselink et al. |
| 2006/0020578 A1 | 1/2006 | Hood |
| 2006/0291653 A1 | 12/2006 | Kawada et al. |
| 2007/0030781 A1 | 2/2007 | Benedikt |
| 2008/0263356 A1 | 10/2008 | Overby |
| 2009/0052671 A1* | 2/2009 | Bauchot .............. G06F 21/10 380/277 |
| 2010/0174910 A1 | 7/2010 | Little |
| 2012/0036041 A1 | 2/2012 | Hesselink |
| 2012/0047396 A1 | 2/2012 | Garani et al. |
| 2012/0066754 A1 | 3/2012 | Karaoguz et al. |
| 2012/0303974 A1 | 11/2012 | Lin et al. |
| 2013/0163764 A1 | 6/2013 | van den Berg et al. |
| 2013/0212401 A1 | 8/2013 | Lin |
| 2013/0215448 A1 | 8/2013 | Gentile et al. |
| 2013/0266137 A1 | 10/2013 | Blankenbeckler et al. |
| 2013/0268749 A1 | 10/2013 | Blankenbeckler et al. |
| 2013/0268759 A1 | 10/2013 | Blankenbeckler et al. |
| 2013/0268771 A1 | 10/2013 | Blankenbeckler et al. |
| 2014/0052996 A1 | 2/2014 | Nin et al. |
| 2014/0095439 A1 | 4/2014 | Ram |
| 2014/0169921 A1 | 6/2014 | Carey |
| 2014/0173215 A1 | 6/2014 | Lin et al. |

OTHER PUBLICATIONS

Office Action dated May 13, 2013 from U.S. Appl. No. 13/460,766, 19 pages.
Interview Summary dated Aug. 16, 2013 from U.S. Appl. No. 13/460,766, 2 pages.
Interview Summary dated Aug. 15, 2013 from U.S. Appl. No. 13/460,616, 3 pages.
Office Action dated Oct. 28, 2013 from U.S. Appl. No. 13/460,616, 18 pages.
Office Action dated May 16, 2013 from U.S. Appl. No. 13/460,616, 14 pages.
Notice of Allowance dated Aug. 12, 2014 from U.S. Appl. No. 13/460,805, 11 pages.
Non-Final OA dated Feb. 6, 2014 from U.S. Appl. No. 13/460,805, 17 pages.
Non-Final OA dated Aug. 6, 2013 from U.S. Appl. No. 13/460,805, 10 pages.

* cited by examiner

DIGITAL RIGHTS MANAGEMENT SYSTEM TRANSFER OF CONTENT AND DISTRIBUTION

CROSS-REFERENCE TO RELATED APPLICATIONS

The present application is a continuation of U.S. patent application Ser. No. 13/460,805, filed on Apr. 30, 2012 entitled, "DIGITAL RIGHTS MANAGEMENT SYSTEM TRANSFER OF CONTENT AND DISTRIBUTION," issued on Dec. 16, 2014 as U.S. Pat. No. 8,914,634, which claims priority to U.S. Provisional Application No. 61/622,312, filed Apr. 10, 2012 entitled, "DIGITAL RIGHTS MANAGEMENT SYSTEM, DEVICES, AND METHODS FOR DIGITAL CONTENT," and U.S. Provisional Application No. 61/636,460, filed Apr. 20, 2012, entitled, "DIGITAL RIGHTS MANAGEMENT SYSTEM TRANSFER OF CONTENT AND DISTRIBUTION," all of which are herein incorporated by reference in their entirety.

BACKGROUND

Many different digital rights management ("DRM") systems have been proposed and implemented on various platforms. In general, DRM refers to technologies that are used to control the use of digital content and devices. For example, DRM is commonly used to prevent unauthorized copying of digital content.

Today, there exists a wide variety of computing devices that enable users to copy and distribute digital content, especially content that has been downloaded or stored on a storage device, such as a hard disk. Furthermore, most DRM systems to date have security weaknesses and have been circumvented. Unfortunately, due to these weaknesses of current DRM systems, content companies have limited their offerings or have employed DRM systems that are difficult to use.

BRIEF DESCRIPTION OF THE DRAWINGS

Systems and methods which embody the various features of the invention will now be described with reference to the following drawings, in which:

FIG. 10 shows an exemplary with a kiosk for distributing content to a storage device according to one embodiment;

DETAILED DESCRIPTION

Figure 1:
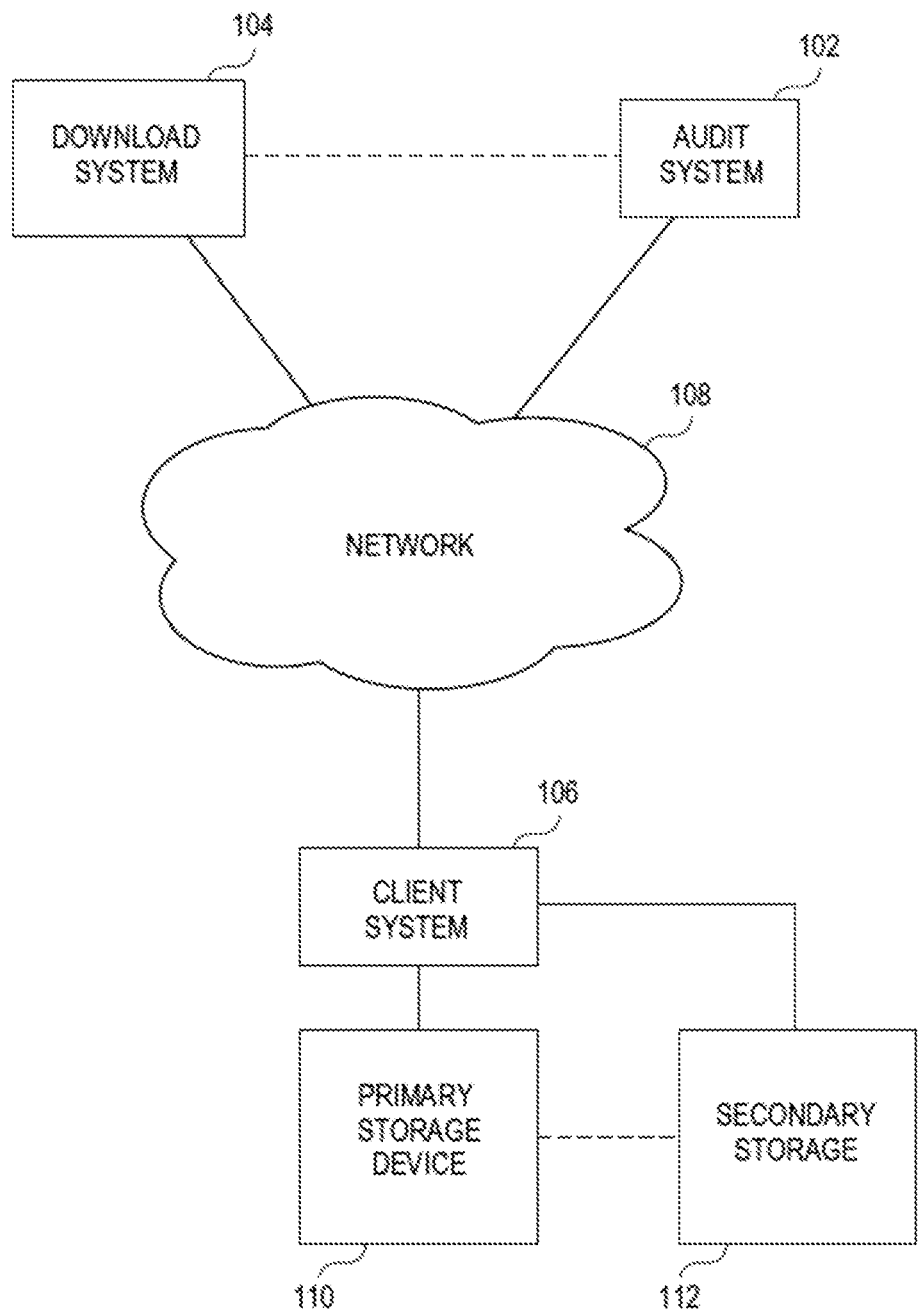
FIG. 1 shows an exemplary system according to one embodiment.

In one embodiment, digital content may be securely transferred via a trusted server from one storage device to another device. In particular, digital content may be transferred based on the transfer of secure metadata, such as keys, rights, etc., from one device to another. Once transfer of the secure metadata has been accomplished, the content may be copied or transferred as well. Digital rights management ("DRM") methods and systems are provided for controlled distribution, transfer, and playback of digital content. For example, digital rights management ("DRM") methods and systems are provided for controlled distribution, for example via a kiosk, of digital content and playback of the digital content. The digital content may comprise the content itself plus metadata. The content may be text, documents, audio, video, multimedia, video games, etc. in any known format. The content metadata may be any data or information associated with the content that is used for handling of the content. The content metadata may be employed to provide for secure handling of the digital content and to provide DRM protections. The content metadata may also comprise one or more digital certificates.

In one embodiment, the DRM system enables secure copying or transfer of content, for example, from one storage device to another storage device. In this embodiment, the transfer of the content is performed based on a trusted, peer-to-peer transfer between storage devices. For example, the storage devices may employ a secure channel that is transparently tunneled through one or more host devices to transfer content directly from one storage device to another. In another embodiment, the DRM system enables secure copying or transfer of content and/or content metadata, for example, from one storage device to another storage device in a peer-to-peer fashion.

In another embodiment, the DRM system enables secure copying or transfer of content and/or content metadata, for example, from one storage device to another storage device via a trusted server. In this embodiment, the transfer of the content and the content metadata is brokered by a trusted server that is authenticated and trusted by both sets of storage devices. The trusted server may be a separate entity of the DRM system or may be a component or function of an existing server of the DRM system.

In another embodiment, a user may obtain one or more copies of content, but does not possess the content metadata, such as necessary cryptographic keys. Accordingly, in this embodiment, a user could interface with the system to obtain the secure metadata and gain access to the content. In one embodiment, the content that is encrypted may only be a portion or portions of the text, document, audio, video, multimedia, video games, etc.

Servers providing content may encrypt each copy of content based on an access key that is unique to that copy of the content. Thus, if an access key is compromised, the protection of only one copy of the content is compromised. In another embodiment, asymmetric cryptography may be employed for securing content.

In addition, the content may be uniquely bound to specific devices, such as an intelligent storage device, based on the configuration of the access key. For example, the access key for the content is generated from at least two components. The first component is a binding key that is unique to the storage device on which the content is stored. In one embodiment, the storage device may generate the binding key using a random number and inputting the random number into a key generator. The second component is a content key that is unique to the content. In one embodiment, the algorithm for generating the access key may be implemented as a licensable or renewable function.

In one embodiment, only certain entities are provided the algorithm for generating the access key based on the two components. For example, the storage device holding content does not retain any copies of its binding key nor does it have the algorithm for generating the access key. The algorithm for generating the binding key may be licensable and renewable.

In one embodiment, two-way authentication is employed, for example, using public key infrastructure ("PKI") and public key certificate-based authentication to ensure that entities in the system are trusted. The various components of the system, such as a storage device, may be intelligent, and thus, capable of two-way authentication with each other, which was not possible in the prior art. For example, the storage device and the player or download server may mutually authenticate with each other. This form of authentication ensures that the storage device confirms a trust relationship with the player and vice versa. Conventional DVD and Blu-ray discs did not contain such features to authenticate or establish trust with a player or download server. The PKI thus provides an environment in which entities of the DRM system can register their identity and establish trust with each other.

In one embodiment, the entities of the DRM system employ public key certificates, i.e., digital certificates for authentication of their identity and determine authorization for various uses of their content. In another embodiment, a trusted party manages a certificate authority ("CA") to supervise the PKI and digital certificates. In addition, multiple levels of CA's can be accommodated in any of the embodiments.

All devices of the DRM system may be issued a certificate from one or more of the CA's. If needed, one embodiment may provide for full revocation of a certificate for an entity. As noted, two-way mutual authentication may be employed between entities to establish secure communications channels for exchanging and distributing the content. Each item of content may also be issued a digital certificate. This allows the content to play a role in determining whether a device can be trusted.

Certain embodiments of the inventions will now be described. These embodiments are presented by way of example only, and are not intended to limit the scope of the inventions. Indeed, the novel methods and systems described herein may be embodied in a variety of other forms. Furthermore, various omissions, substitutions and changes in the form of the methods and systems described herein may be made without departing from the spirit of the inventions. To illustrate some of the embodiments, reference will now be made to the figures.

FIG. 1 shows an exemplary system 100 of the embodiments. As shown, the system 100 may comprise, among other things, an audit system 102, a download system 104, a client system 106, and a network 108. These components and certain aspects of their operation will now be further described.

The audit system 102 serves as a trusted party for system 100. In addition, the audit system 102 may provide various management functions related to the distribution and playback of content in system 100. In one embodiment, the audit system 102 validates and certifies encryption keys as part of the PKI employed in system 100. The audit system 102 is further described with reference to FIG. 2.

The download system 104 comprises the hardware and software components for distributing content in system 100. In one embodiment, the download system 104 comprises a website, which includes links to the content. The download system 104 may also provide links to allow for transactions with the audit system 102, such as links to key servers and certificate authorities. The download system 104 is further described with reference to FIG. 3.

The client system 106 may be any device used to access content provided by the system 100. For example, the client system 106 may comprise a computer, a television, a portable or mobile device, a video game console, a portable video game console, as well as associated storage. Any device capable of downloading, storing, or playing content may be implemented as part of the client system 106. For example, the client system 106 may comprise a desktop computer, a laptop computer, a tablet, a smartphone, a television, a digital video recorder, a set-top box, a video game console, or portable video game console, or other form of electronic device. The client device 106 may also comprise a network that is wired and/or wireless and storage, such as a network attached storage ("NAS") or external drives. The embodiments may work with any form of storage device, such as solid state and flash memory storage. The client system 106 is further described with reference to FIG. 4.

The client system 106 may comprise multiple storage devices that a user may use to store and access client. For example, as shown, the client system 106 may comprise a primary storage device 110 and a secondary storage device 112. The primary storage device 110, for example, may be a hard disk drive, a flash memory drive, a hybrid drive, etc. Such storage devices are known to those skilled in the art. In another embodiment, the storage device may be a network attached storage.

The secondary storage device 112 represents any additional storage that may be used by the client system 106. For example, the secondary storage device 112 may be an additional hard drive of the client system 106, an external drive, etc. Alternatively, the secondary storage device 112 may be a backup storage to the primary storage device 110. In another embodiment, the storage device may be a network attached storage.

The network 108 provides a communication infrastructure by which the various components of system 100 communicate. Network 108 may comprise any collection of networks and network elements. For example, the network 108 may be implemented over the Internet. However, the network 108 may comprise any local area network, metropolitan area network, or wide area network and may be implemented as a private network, a public network, etc. Additionally, network 108 may comprise wired or wireless communication links.

Trusted server 114 serves as a controlling authority allowing content to be moved from one storage device to another storage device. In one embodiment, the trusted server 114 may be implemented with known hardware and software. For example, the trusted server 114 may be a server coupled to the network 108 that is separate from the other servers of the system. Alternatively, the trusted server 114 may be implemented on the same hardware or may be integrated as a component of another component, such as download system 104 or audit system 102. The trusted server 114 may be configured to control copying and transfer of content based on using the content's digital certificate or secure content metadata, for example, stored in download system 104. An exemplary process for transfer or copy of content is described further with reference to FIG. 7A.

The system 100 may support several scenarios for downloading and playing content. For example, content can be downloaded via the network 108 to a portable storage device from client system 106. The content may then be played on a playback device, such as a Blu-Ray player, game console, TV, by streaming the content from the storage device. As another example, the playback device may include an integrated storage device that is used for both download and playback of content. As another use case, content may be downloaded onto a NAS system in client system 106.

Yet another implementation may comprise a client system 106 having a networked storage device or media player to which the content is bound. A user of client system 106 may then remotely access the content and play it on a mobile device, such as an iPad, iPod, iPhone, a portable video game console, such as PlayStation® portable or a Nintendo DS, etc., which is connected to the storage device or media player via a secure connection, such as a wireless connection, over a WiFi, 3G, 4G, or other communication channel. In another implementation of system 100, the client system 106 comprises a portable storage device or media player that is accessible wirelessly, such as via Bluetooth or WiFi or similar communication system. The portable storage device or media player in client system 106 may thus act as a source of content for playback on portable and network enabled viewing devices in client system 106.

Figure 1A:
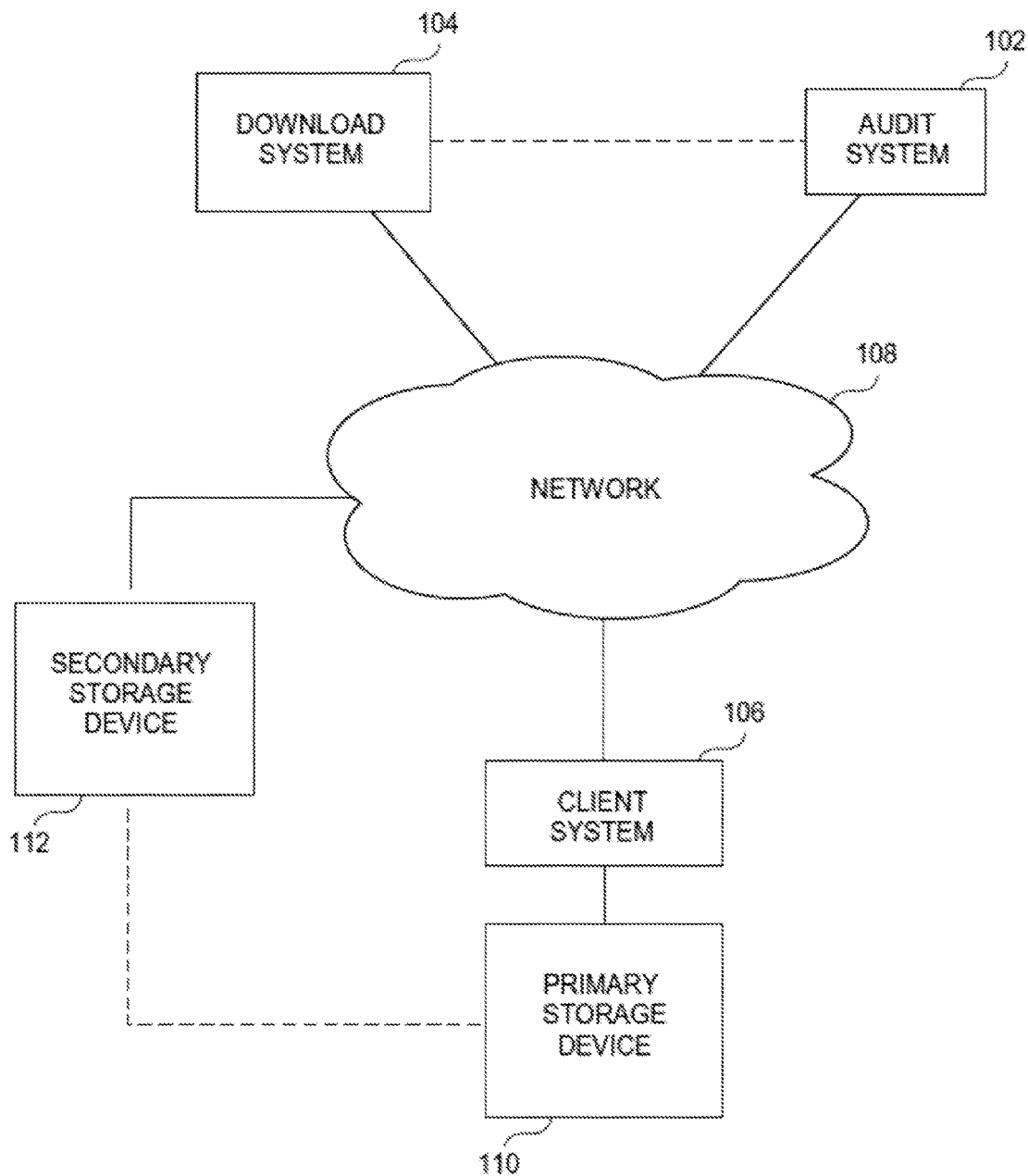
FIG. 1A show an exemplary peer-to-peer system according to another embodiment.

FIG. 1A shows another exemplary peer-to-peer system 100 of an embodiment. As shown, the system 100 may comprise, among other things, an audit system 102, a download system 104, a client system 106, and a network 108. In this embodiment, the secondary storage 112 is remote from the client system 106, such as a network backup storage system, a network attached storage, or cloud storage system.

Secondary storage system 112 may be any system and service that provides client system 106 backup and storage for files, including content protected by the DRM of system 100. The storage system 112 may be implemented based on known hardware and software. For example, secondary storage system 112 may be a server, a file hosting service, a content locker, and the like. In one embodiment, the secondary storage system 112 may employ HTTP and FTP access for access to the files. In addition, the secondary storage system 112 may provide automatic or periodic backups of primary storage 110, encryption, file-by-file restoration, file synchronization, data compression, versioning, etc.

Figure 1B:
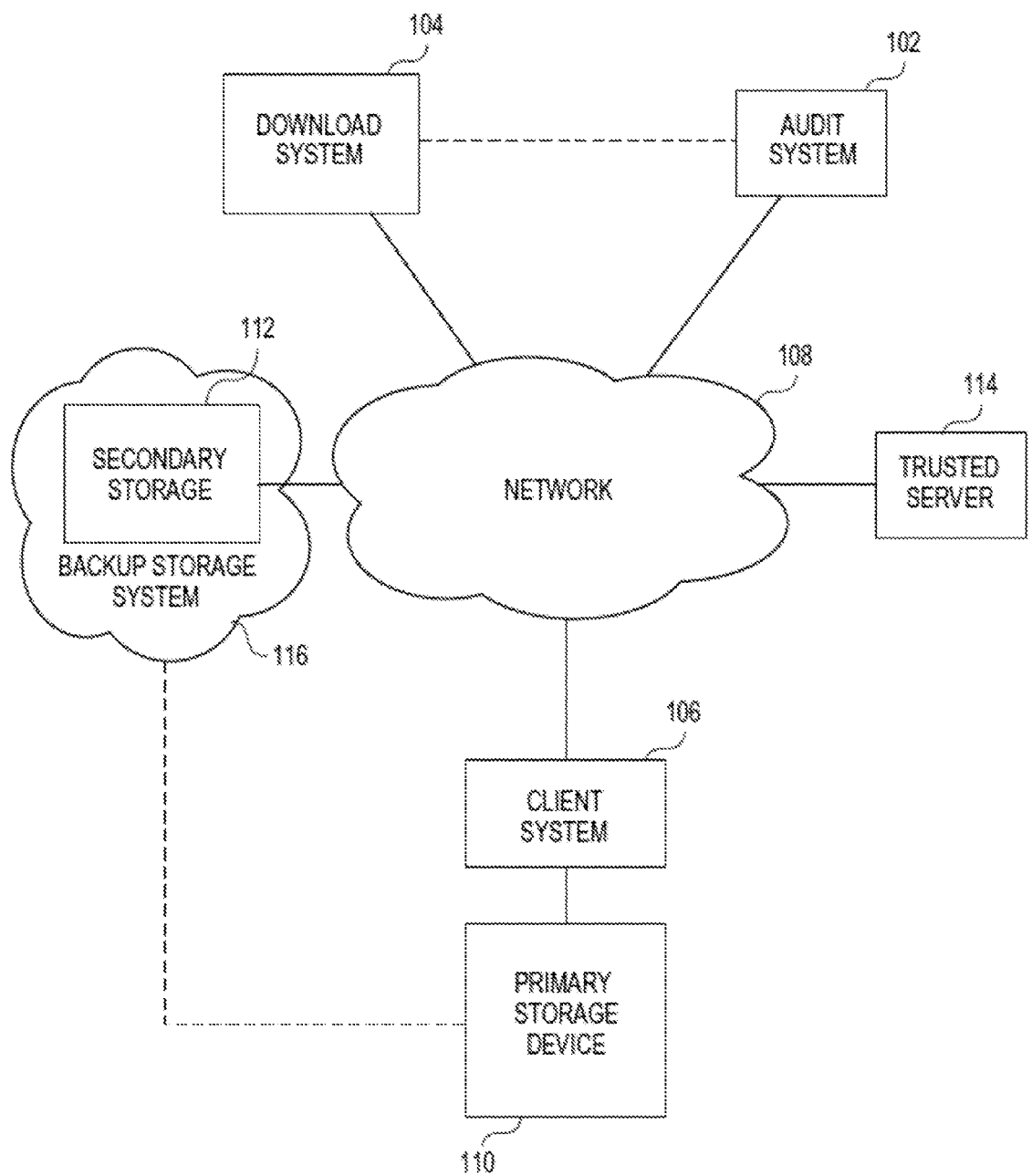
FIG. 1B show an exemplary trusted server system according to another embodiment.
Figure 1C:
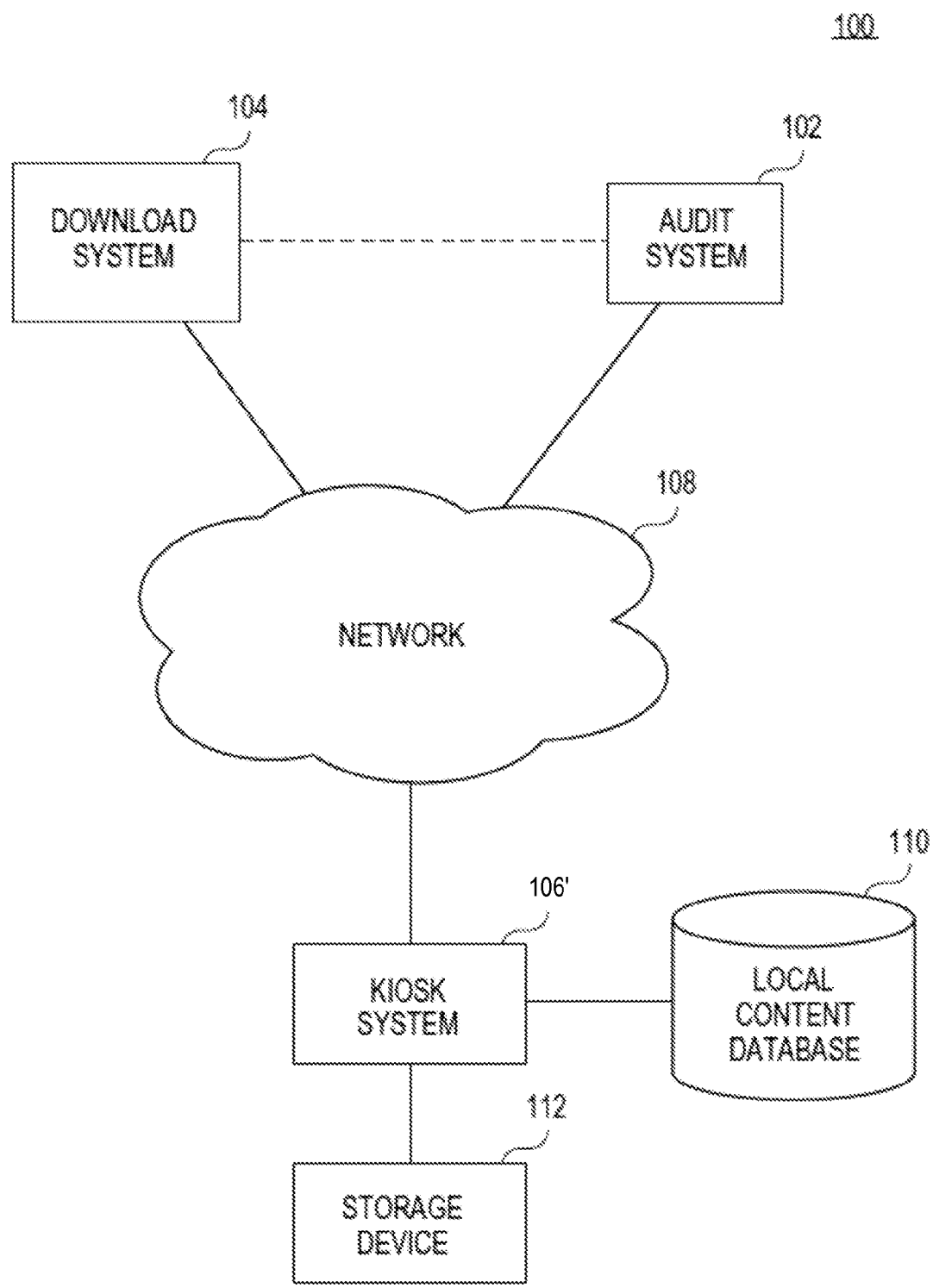

FIG. 1B shows another exemplary trusted server system 100 of an embodiment. As shown, the system 100 may comprise, among other things, an audit system 102, a download system 104, a client system 106, a network 108, and the trusted server 114. In this embodiment, the secondary storage 112 is implemented as part of a remote backup storage system 116. Alternatively, the secondary storage 112 may be a network attached storage.

Backup storage system 116 may be any system and service that provides client system 106 backup and storage for files, including content protected by the DRM of system 100. Backup storage system 116 may be implemented based on known hardware and software. For example, backup storage system 116 may be a server, a file hosting service, a content locker, and the like. In one embodiment, the backup storage system 116 may employ HTTP and FTP access for access to the files.

Backup storage system 116 may also provide various features to secure secondary storage 112. For example, the backup storage system 116 may provide automatic or periodic backups of primary storage 110, encryption, file-by-file restoration, file synchronization, data compression, versioning, etc. As shown, the dotted line shows a functional relationship. In one embodiment, the secure connection is brokered through the client system as a secure tunnel that is transparent to the client system.

FIG. 10 shows an exemplary system 100 of the embodiments having a kiosk for distributing content to a storage device. As shown, the system 100 may comprise, among other things, an audit system 102, a download system 104, a kiosk 106', and a network 108. These components and certain aspects of their operation will now be further described.

The audit system 102 serves as a trusted party for system 100. In addition, the audit system 102 may provide various management functions related to the distribution and playback of content in system 100. In one embodiment, the audit system 102 validates and certifies encryption keys as part of the PKI employed in system 100. The audit system 102 is further described with reference to FIG. 2.

The download system 104 comprises the hardware and software components for distributing content in system 100. In one embodiment, the download system 104 comprises a website, which includes links to the content. The download system 104 may also provide links to allow for transactions with the audit system 102, such as links to key servers and certificate authorities. The download system 104 is further described with reference to FIG. 3.

The kiosk 106' may be any device used to access and distribute content provided by the system 100. For example, the kiosk 106' may be implemented as a self-service computer terminal. In one embodiment, the kiosk 106' may comprise specialized hardware and software that is designed such that kiosk 106' is placed in a public environment. The kiosk 106' may comprise various user interface equipment, such as a keyboard, display, etc. to allow use of the kiosk 106'.

As shown, the kiosk 106' may be coupled, directly or indirectly, to a local content database 110. The local content database 110 serves as a local storage infrastructure for a plurality of content downloaded, for example, from the download system 104. Thus, as shown, a user may connect a storage device 112 to the kiosk 106' and download content from the local content database 110 or the download system 104. The kiosk 106' is further described with reference to FIG. 4.

The network 108 provides a communication infrastructure by which the various components of system 100 communicate. Network 108 may comprise any collection of networks and network elements. For example, the network 108 may be implemented over the Internet. However, the network 108 may comprise any local area network, metropolitan area network, or wide area network and may be implemented as a private network, a public network, etc. Additionally, network 108 may comprise wired or wireless communication links.

The system 100 may support several scenarios for downloading and playing content. For example, content can be downloaded via the network 108 to a portable storage device 112 from kiosk 106'. The content may then be played on a playback device, such as a Blu-Ray player, game console, TV, by streaming the content from the storage device. As another example, the playback device may include an integrated storage device that is used for both download and playback of content.

Yet another implementation may comprise a kiosk 106' having a high speed interface, such as USB 3.0 interface, etc., to which a storage device or media player may connect. A user of kiosk 106' may then access the content in local database 110 or download content from the download system 104 for later play on a mobile device, such as an iPad, iPod, iPhone, etc. In one embodiment, the kiosk 106' is connected to the storage device or media player via a secure connection, such as a wireless connection, over a WiFi, 3G, 4G, or other communication channel, such as USB 3.0.

Figure 2:
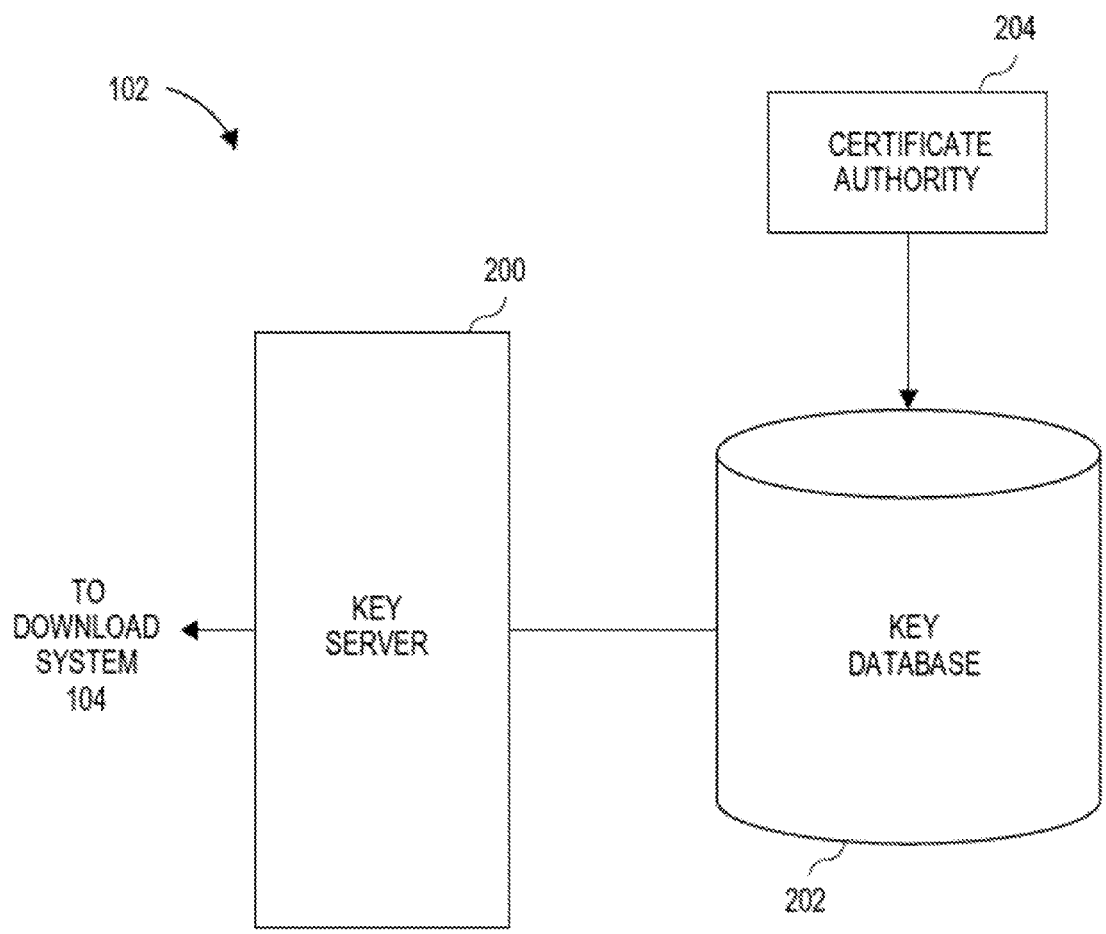
FIG. 2 shows an exemplary audit system according to one embodiment.

FIG. 2 shows an exemplary audit system of the embodiments. As shown, the audit system 102 may comprise a key server 200, a key database 202, and a certificate authority 204.

The key server 200 is a server that receives and serves various cryptographic keys used in one embodiment. The key server 200 may be implemented using known hardware and software. In one embodiment, the key server 200 distributes keys as part of a digital certificate. The digital certificate may contain the key and also information about the owner of the key. The key server 200 may provide certificates in a known format, such as X.509, PKCS, Open PGP, etc.

The key database 202 stores the keys and other related information used by the key server 200. The key database 202 may be implemented using well-known database management systems, such as Oracle, DB2, Microsoft SQL, PostgreSQL, and MySQL.

The certificate authority (or CA) 204 issues digital certificates for the system 100. Certificate format and contents may be customized for each trusted party in system 100. In addition, in one embodiment, each item of content may have a trusted party certificate as part of its metadata. The certificates allow software associated with the content to independently determine if a player in client system 106 is attempting to access the content can be trusted. For example, software associated with the content could restrict high definition content or other portions of content from being accessible to a player, if the player in client system 106 is not trusted. In system 100, any trusted party can revoke all certificates, revoke certain certificates, or certain portions of certificates that have been issued In one embodiment, public key infrastructure (PKI) is used for certificate signing. For example, in system 100, PKI is used in client system 106 during device authentication and to establish a secure communications channel between a storage device, download system 104, or playback device. In one embodiment, two-way authentication is employed between the various entities in system 100. For example, the storage device may be an intelligent device that is configured to actively authenticate and establish a trust relation with a playback device or download server 104 based on a full two-way authentication.

Between entities of system 100, each secure session may use unique security parameters. For example, the session key, session ID, initialization vector ("IV"), hash-based message authentication code ("HMAC") key may be made unique for each session. In one embodiment, the system 100 uses secure channels of communication that are protected based on symmetric cryptography. In another embodiment, the system 100 may use PKI to establish secure channels.

Figure 3:
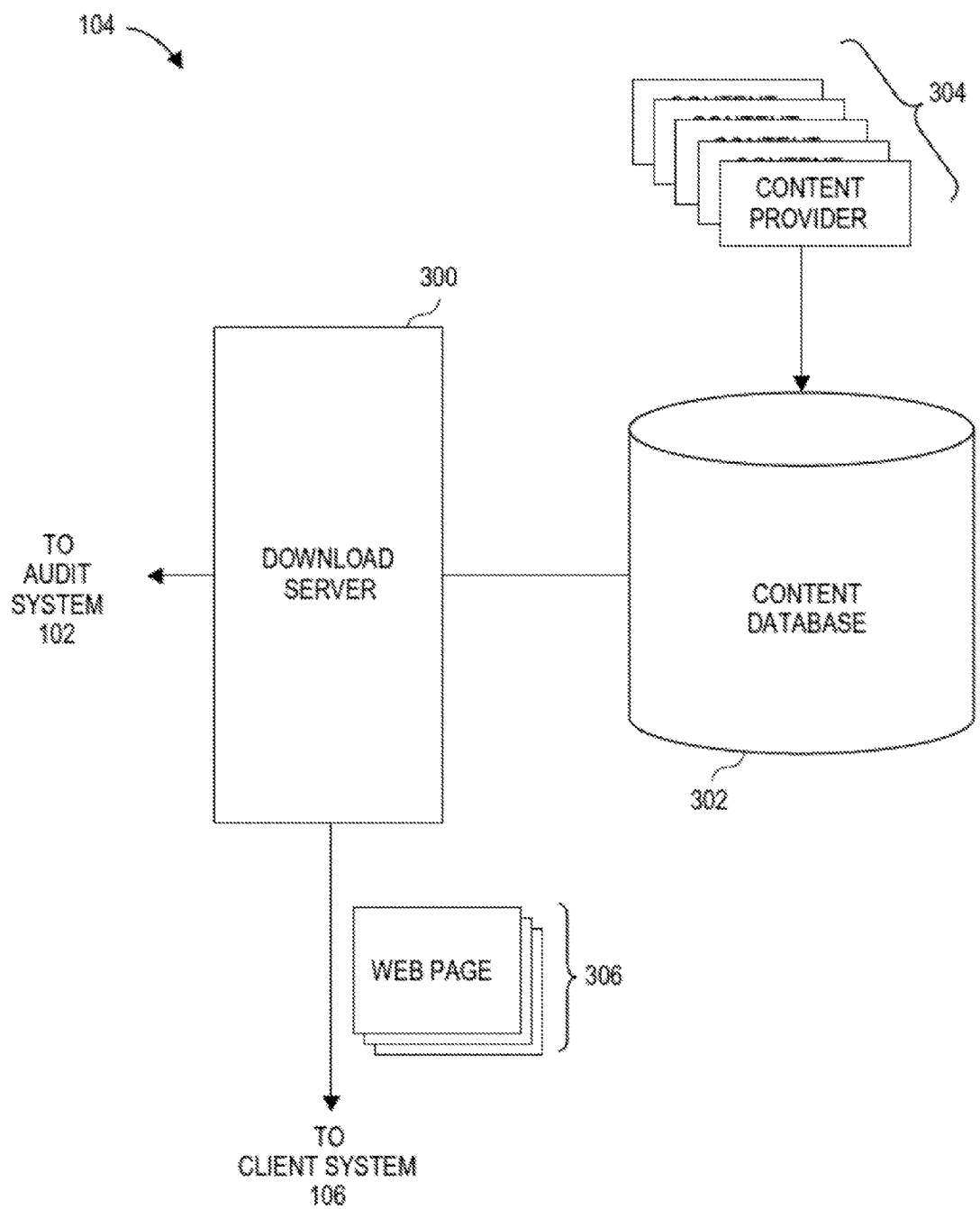
FIG. 3 shows an exemplary download system according to one embodiment.

FIG. 3 shows an exemplary download system of the embodiments. As shown, the download system 104 may comprise a download server 300 and a content database 302.

The download server 300 delivers the content for the system 100, for example, to client system 106. In one embodiment, download server 30 encrypts the content with an access key that may be derived from a binding key and a content key. The binding key and content key are further described below.

As shown, the download server 300 may comprise a web server that provides various web pages 306 to client system 106 to make content in content database 302 accessible. In one embodiment, the download server 200 provides one or more websites having a collection of web pages 306 in order to serve the content.

In one embodiment, each copy of content is uniquely encrypted. The content may be uniquely encrypted in its entirety or certain portions of the content may be uniquely encrypted. Thus, if an item of content or its access encryption is ever compromised, the compromise is limited to that item of content. As will be described further below, only the download server 300 and a player have the algorithm to generate the access key. In addition, as noted, the algorithm for generating the access key may be licensable or renewable function.

The content database 302 stores the content, content metadata, and related information served by the download server. Provides a storage and access infrastructure for providing the items of content. Such database management systems are known to those skilled in the art.

The content providers 304 conceptually represent the source of the content. For example, the content providers 304 may represent other databases or content repositories, content delivery networks, and the like. Any source of content may be included in any of the embodiments.

Figure 4:
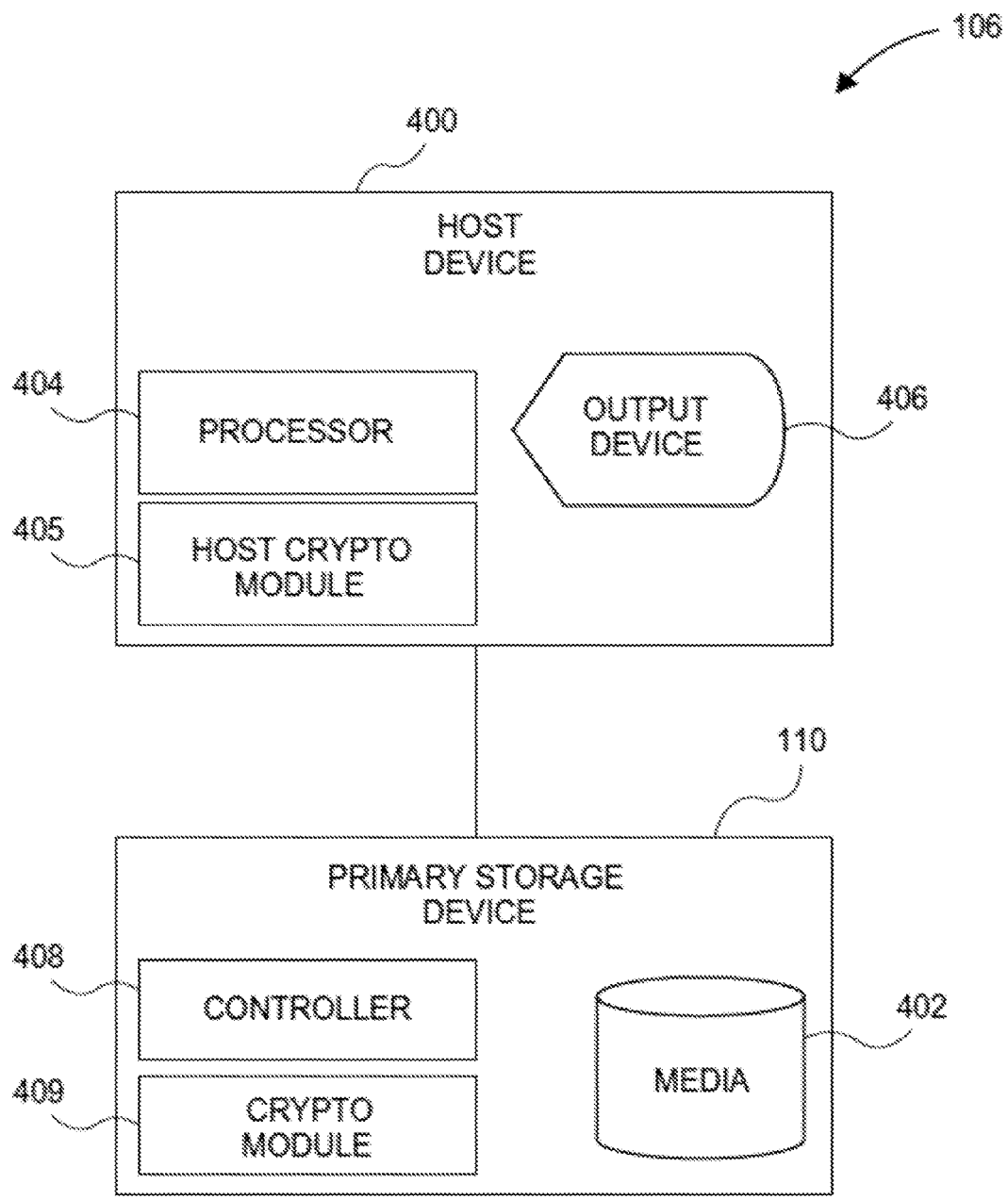
FIG. 4 shows an exemplary client system according to one embodiment.

FIG. 4 shows an exemplary client system 106 of the embodiments. A concern of many content providers is software-based players in client systems are considered a high security risk due to their ease of modification and susceptibility to hacking. One benefit of the embodiments is that client system 106 includes devices having a hardware root of trust. A hardware root of trust in a device comprises secure cryptographic hardware that enables playback of the content that is not just software based, but instead makes use of the cryptographic hardware provided in the hardware root of trust.

For example, in one embodiment, media players may include dedicated hardware cryptographic processing circuits and cryptographic boundaries for performing secure computations and secure storage of critical cryptographic parameters. As another example, network attached storage ("NAS") controllers may include dedicated hardware that can serve as a root of trust. Accordingly, one embodiment may provide a secure DRM system enabling secure download of content, secure storage of content, and secure playback of content.

As will be further described, the client system 106 comprises intelligent storage devices, such as a primary storage device 110 having a storage medium 402 and controller 408 that includes a hardware root of trust as part of a cryptographic processing module 409. In the embodiments, the cryptographic processing module 409 is isolated from the other controller functionality. Clear text asymmetric and symmetric key access is limited to the cryptographic module. In this embodiment, asymmetric and symmetric keys may be generated within the cryptographic module. Public/private key pairs are used with the DRM of system 100. Any keys stored outside the cryptographic module are cryptographically protected. Since the asymmetric and symmetric keys are inside the cryptographic module 409, it is difficult for an attacker to gain access to the private keys. This allows for a secure PKI implementation as part of the DRM of system 100. In another embodiment, various keys or encryption data may be injected or securely stored on the storage device 110.

For example, one or more keys may be injected on to the storage device 110 in a secure manufacturing environment.

In one embodiment, the cryptographic module 409 is used to generate additional keys securely inside its boundaries. For example, the cryptographic module 409 may be configured to generate a binding key that is used to bind content to the storage device 110. The cryptographic module 409 may also include a capability to digitally sign secure information and store it in non-secure memory, and digitally sign and encrypt secure information and store it in non-secure memory.

In one embodiment, playback devices in client system 106 may also be issued certificates from a certificate authority 204. This certificate may be stored in a secure area not accessible by the processor of the player in one embodiment. In another embodiment, the player running, for example, on a host device may store the certificate anywhere, such as, in a user area of the storage medium 402 or other non-secure area. The playback device may store the certificate in encrypted form or protected form, such as with a digital signature. When the player and storage device 110 perform authentication, the cryptographic modules in both devices will be the only entities that have access to the secure data to perform authentication and to establish a secure communication channel.

In one embodiment, the content and content metadata does not provide access for accessing the content. Instead, once a secure communication channel is established, the playback device will request the binding and content key. Responsive to this request, the storage device may then send the binding and content keys to the player so that it can generate the access key. The access key is used to decrypt and render the content. Those skilled in the art will recognize that by using these secure cryptographic modules for security related communications and handling of security parameters, content metadata (such as the binding and content keys), and keys, the DRM of system 100 is more difficult to attack and compromise than existing systems.

As shown, the client system 106 may comprise a host device 400 and a storage device 110. The host device 400 may comprise, among other things, a processor 404, a host cryptographic module 405, and an output device 406. These components of host device 400 will now be further described.

The processor 404 comprises the hardware for executing instructions directing the operations of the host device 400. Such processors are known to those skilled in the art.

The host cryptographic module 405 comprises the hardware for carrying out cryptographic operations for the host device. In addition, the host cryptographic module 405 may be packaged or embedded with various security measures to resist tampering.

The output device 406 represents any device intended to output content. For example, the output device 406 may comprise a display, audio speakers, etc. Such output devices are well-known to those skilled in the art.

The storage device 110 may comprise, among other things, a storage medium 402, a controller 408, and a cryptographic module 409. These components of storage device 110 will now be further described.

The controller 408 comprises the hardware and firmware that controls the operation of the storage device 110 and enables communications with the host device 400. Controller 408 may be implemented using known hardware and components.

The cryptographic module 409 provides a basis of trust, such as a hardware root of trust, for the storage device 110. In one embodiment, the cryptographic module 409 is a secure crypto-processor that is configured to perform various cryptographic operations. In one embodiment, cryptographic module 409 may be implemented as an external system on chip that is packaged with various security measures to detect tampering and make it tamper resistant. In another embodiment a cryptographic module 409 may be implemented as part of or embedded within another system-on-chip or other hardware that is packaged with various security measures to make tamper detection or resistant. The cryptographic module may or may not be isolated from the other system-on-chip ("SoC") functions, The storage media 402 refers to the physical media used by the storage device 110 to store information. In one embodiment, the storage media 402 may comprise magnetic media, optical media, semiconductor media, such as flash memory, and the like. The storage media 402 may comprise any combination of these media in one embodiment.

Figure 5:
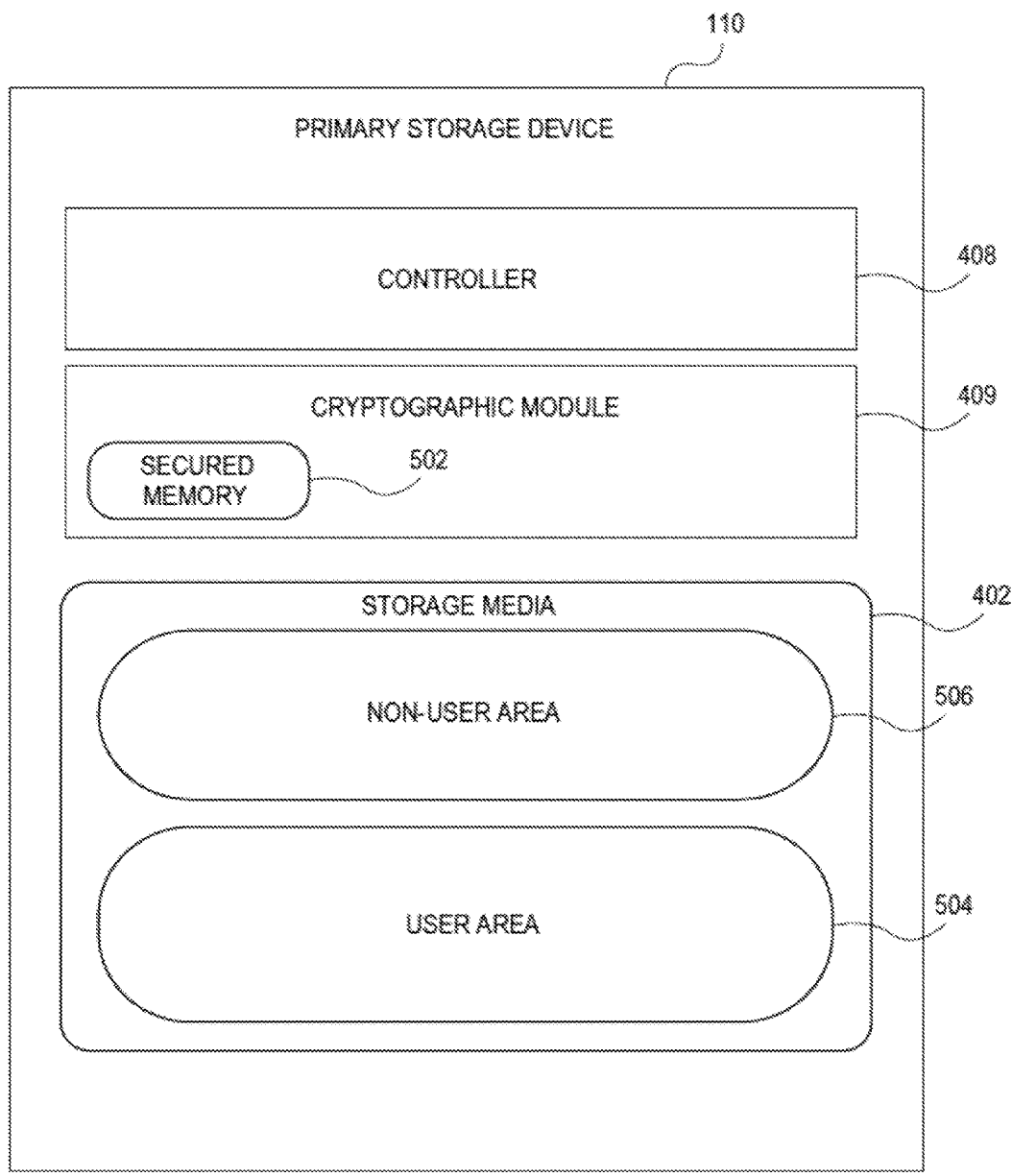
FIG. 5 shows an exemplary storage device according to one embodiment.

FIG. 5 further shows an exemplary storage device 110 of the embodiments. As shown, the cryptographic module 409 may comprise a secured memory 502. In addition, the storage media 410 may comprise a user area 504 and a non-user area 506.

The secured memory 502 provides a secure area to store sensitive information, such as content metadata, related to the DRM provided by system 100. In one embodiment, the secured memory 502 is implemented as a one-time programmable non-volatile memory ("OTP NVM"). As an OTP NVM, the secured memory 502 can only be programmed once and is difficult to alter. In addition, the secured memory 502 may also comprise one or more memories, such as a ROM, static RAM, and dynamic RAM.

As to user area 504, this area of storage media 410 is provided as storage space that is accessible by the host device 400. For example, the user area 504 may be addressable based on logical block addresses ("LBA") used by the host device 400.

The storage device 110 can be configured to contain a partition in the user space 504 that is secured. That is, data in this partition may be encrypted using a separate key generated by the cryptographic module 409. Access to this partition would only granted to authenticated download clients or players. In one embodiment, all or certain data from this partition in user space 504 may only be sent over a secure authenticated channel.

This partition of user space 504 can be used, for example, for additional content metadata files and information related to the DRM of system 100. The actual content itself may be sent from the download server 300 or to a player in client system 106 only in encrypted form, so the content can be stored in the user space 504.

As shown, the storage device 110 may also comprise a non-user area 506. The non-user area 506 is a reserved area of the storage media 410 that is not directly accessible by the host. For example, the non-user area 506 may refer to an area that is not addressable by the host system. In one embodiment, the non-user area 506 is reserved for use by the controller 408, and cryptographic module. For example, to store various sensitive information, such as content metadata information, related to the DRM of system 100.

In one embodiment, the cryptographic module 409 may create new secure keys and allow the storage device 110 to create a secure unique disk encryption key for a special partition area of the medium that is not visible in the user LBA space, such as the non-user area 506. The cryptographic module 409 using this key may thus encrypt all data to this non-user area 506.

The non-user area 506 may be used to store secure metadata related to the DRM of system 100. This metadata may include, for example, certificates, key files, license files, etc.

For example, the storage device 110 will have a certificate issued to it from certificate authority 204. This certificate may be stored in this non-user area 506 and will be encrypted with the key for this area. This will bind the certificate to the storage device 110. Thus, if a clone copy of the drive is somehow fabricated, the clone will not include the encryption key used for the non-user area 506, and thus, the data stored in this area cannot be correctly decrypted.

Alternatively, critical security parameters, such as keys, certificates, or other objects, may be individually cryptographically protected and stored to the storage media.

Accordingly, in one embodiment, in order to access content, the controller 408 and the recording medium 410 cannot function separately from each other. In other words, a complete copy of either the controller 408 or the medium 410 individually will not be sufficient to access content.

Figure 6:
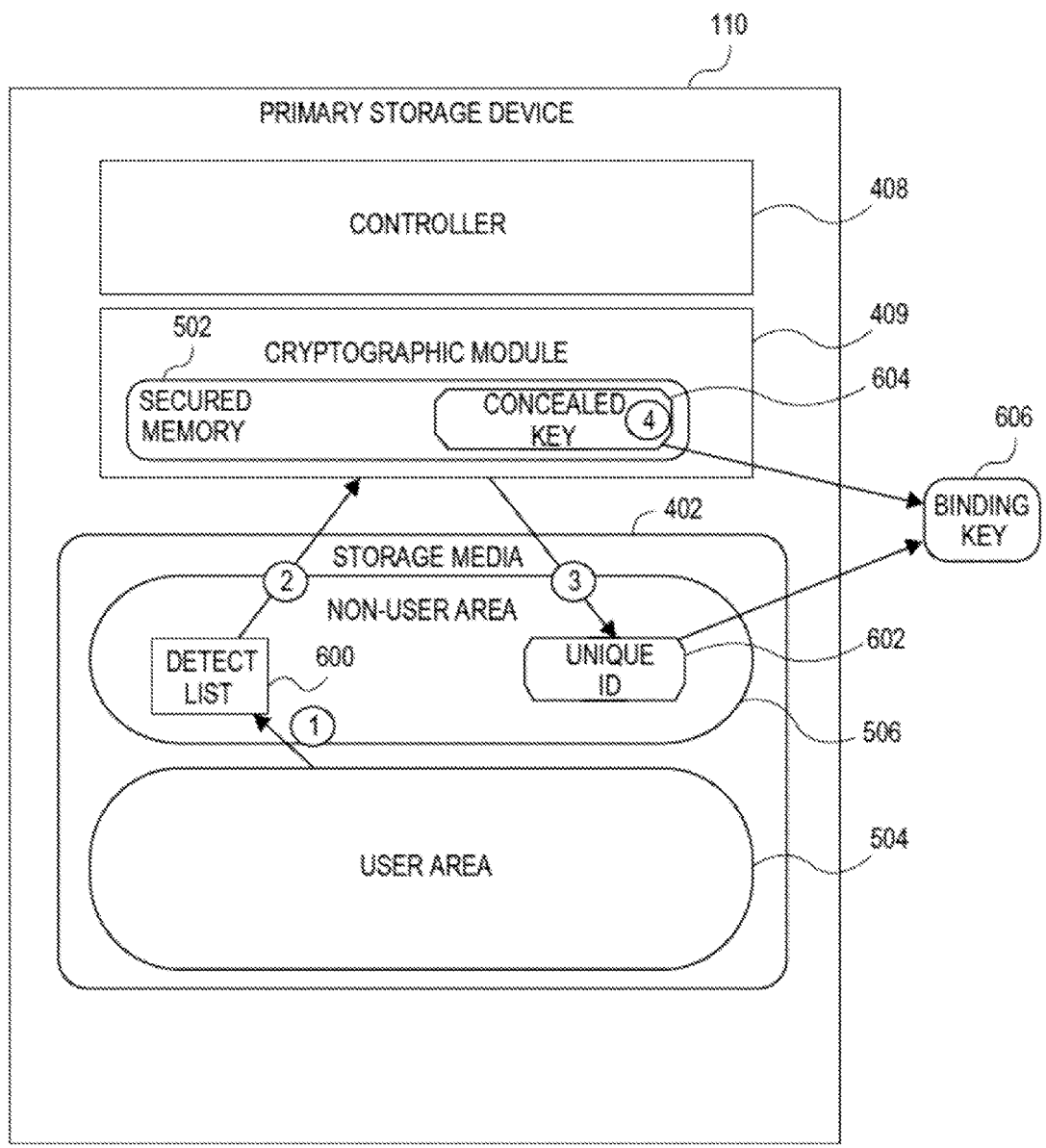
FIG. 6 illustrates an exemplary process flow for generating a binding key that binds content to a storage device according to one embodiment.

FIG. 6 illustrates an exemplary process flow for generating a binding key that binds content to a storage device. In one embodiment, the storage device may generate the binding key using a random number and inputting the random number into a key generator. The key generator may be software running in the storage device or a hardware component of the storage device. In one embodiment, the binding key is made from two parts. In one embodiment, the first part is based on the defect list of the storage device. The second part is based on a key concealed by a cryptographic module on the storage device. In order to protect the binding key, the binding key is not stored with the content or with the content metadata in the storage device 110. Instead, the parts of the binding key are stored separately. In addition, in one embodiment, the binding key is generated as an ephemeral key, and thus, computed by the storage device only when needed. This method also includes the capability for renewable functions. As noted, the binding key may be unique to individual storage devices or unique to a class of devices, such as devices of the same type, etc.

As shown, first, the storage device 110 is prompted to determine or identify a unique characteristic about itself. For example, the storage device 110 may determine or identify a defect list 600. In one embodiment, the defect list 600 corresponds to the P-list or time-zero list of defects that were present on storage media 410 at the time of manufacture. Of course, in other embodiments, the unique characteristic may be derived or originate from other portions of the storage device 110.

Second, the cryptographic module 409 cryptographically processes the defect list 600 and generates a unique identifier 602. For example, the cryptographic module 409 may calculate a hash of information from the defect list 600. In addition, the cryptographic module 409 may digitally sign the unique identifier 602. Alternatively, the unique identifier 602 may be generated by using a random number generator to generate a random number that is unique to the storage device. For example, the cryptographic module 409 may comprise a random number generator that is a physical device or component within cryptographic module 409 or software running in the cryptographic module 409. Alternatively, the random number generator may be separate software or a hardware device running on the storage device.

Third, the cryptographic module 409 may store the unique identifier 602 in a secure area. For example, as shown, the cryptographic module 409 may also store the cryptographically protected unique identifier 602 in the non-user area 506.

Fourth, the cryptographic module 409 may generate a concealed key 604. In one embodiment, the key 604 is concealed in that it is not stored with the other content metadata and instead resides in the secured memory 502. The cryptographic module 409 may generate one or a set of multiple concealed keys 604. Thus, if one of these keys becomes compromised, the cryptographic module 409 may switch to the next key in the set. If all the keys are used, or if it is not desired to create and store a set of keys, then the cryptographic module 409 may generate a new concealed key 604 upon request. Of note, the controller 408 may be configured to track which content is bound to which key.

Based on the unique identifier 602 and the concealed key 604, the storage device 110 may generate a binding key 606 that is derived from information provided by both the controller 408 and from unique characteristics of the storage medium 410. In one embodiment, the cryptographic module 409 ephemerally generates the binding key 606.

The binding key 606 cryptographically binds content to the storage device 110. For example, the binding key 606 may be sent as part of the content's metadata over a secure communications channel to the download server 300 in download system 104. The download server 300 may then use the binding key as one component of an access key used to encrypt the content.

At appropriate times, the binding key 606 may also be made available to authenticated players over a secure channel for use during playback of the content. For example, the storage device 110 may be configured with a special command that is only accepted when the sending device has been authenticated and is communicating over a secure channel.

Based on the binding key 606, even if an exact bit-by-bit copy of the entire media 410 is accomplished, the cloned media will not be usable for rendering the content since the concealed key in storage device unique and securely stored in the secured memory 502 of the cryptographic module 409 and is not copy-able or clone-able to another drive.

Figure 7:
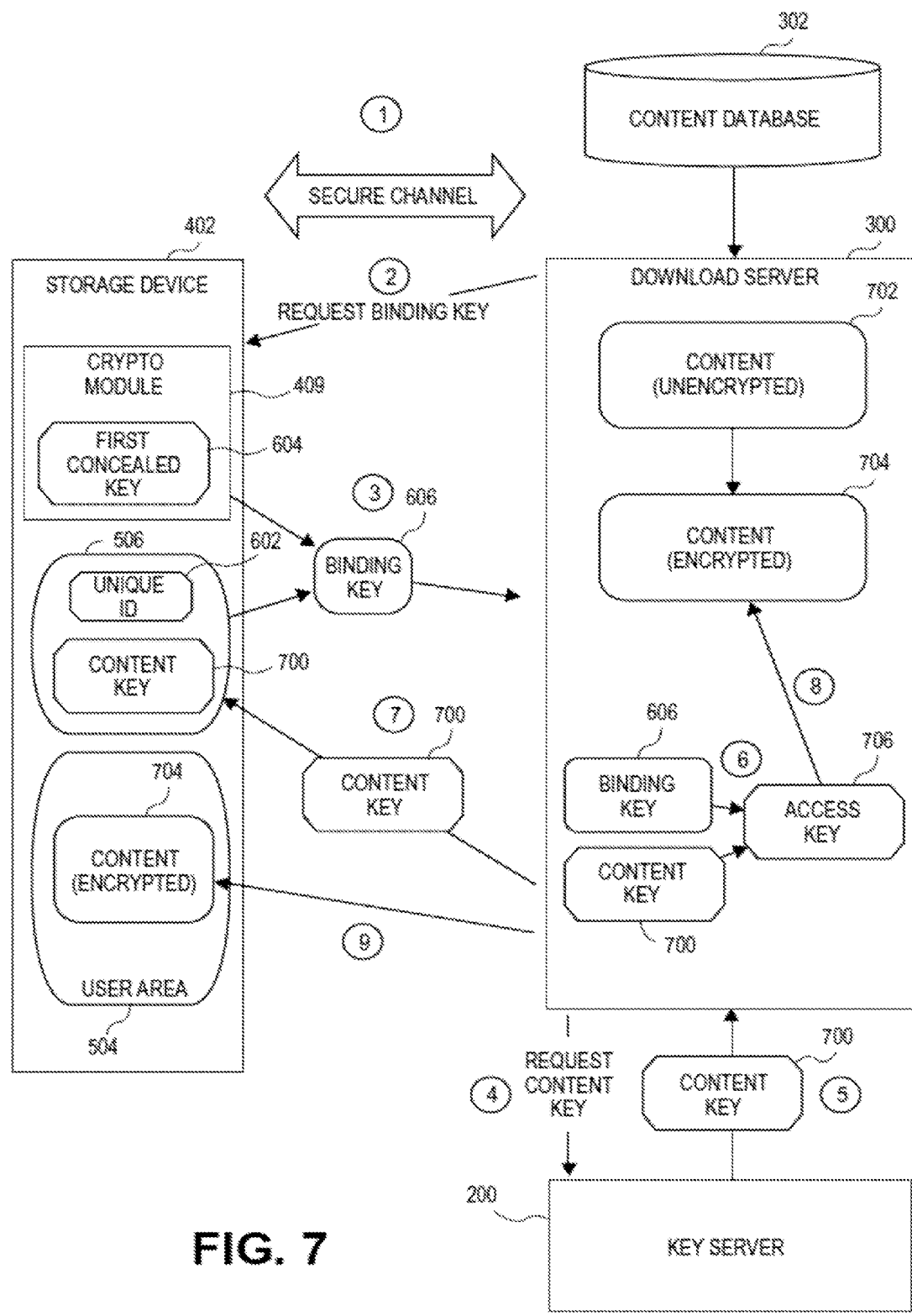
FIG. 7 illustrates an exemplary process flow for provisioning content to a storage device according to one embodiment.

FIG. 7 illustrates an exemplary process flow for provisioning content to a storage device. In this embodiment, revocability and renewability are attributes of the DRM system. As an additional security system component, the process flow illustrated may comprise various renewability features. For example, keys may be retired or random keys pre-generated can be used with a secure allocation algorithm that can either be varied from time to time or which makes use of multiple keys in a random fashion for each item of content to be provisioned to the storage device 110. For example, the embodiments may utilize tokenizing of an update file that could be suitable for all players.

In one embodiment, the process relates to provisioning of content and content metadata, such as a binding key and content key. Other metadata, such as digital certificates, etc., may also be provisioned as part of an embodiment.

As shown, first, the storage device 110 and the download server 300 establish a secure communication channel with each other. For example, the download server 300 and the storage device 110 may employ PKI to establish a secure communications channel. In particular, the host 400 may request a certificate from the storage device 110. The storage device 110 may retrieve its certificate, for example, from its non-user area 506 in media 510. The storage device 110 may then send a device session ID and its certificate. The certificate includes its public key; $Public_{Device}$.

In one embodiment, the host 400 verifies the certificate. For example, the host 400 may check the signature on the certificate. Host 400 may also checks its revocation list to make sure the certificate from storage device 110 is not revoked. Alternatively, host 400 may communicate over network 108 with audit system 102 and certificate authority 204 to verify the certificate and check revocation status of the certificate.

Host 400 then responds by sending a host session ID and its certificate, which includes its public key, $Public_{Host}$, to storage device 110. The storage device 110 verifies the host certificate and checks the signature. The storage device 110 may also check its own revocation list to make sure the host 400 is not revoked.

Next, the host 400 may request a session key from the storage device 110. In response, in one embodiment, the storage device 110 encrypts a random session key, a random device initialization vector ("IV"), and random device hash-based message authentication code ("HMAC") key with $Public_{Host}$, and sends it to host 400.

Host 400 decrypts the information with $Private_{Host}$ to recover the device session key, the device IV, and the device HMAC key. Host 400 encrypts a random host session key, a random host IV, and random host HMAC key with $Public_{Device}$, and sends this information to storage device 110. The storage device 110 then decrypts this information with $Private_{Device}$, to recover the host's 400 session key, host IV, and host HMAC key.

The host 400 may also encrypt a random challenge with the device session key and sends it to the storage device 110. The storage device 110 decrypts the host random challenge with the device session key, and then encrypts the host random challenge with the host session key, and sends this information back to the host 400. The host 400 decrypts the host random challenge with the host session key and confirms it matches what was originally sent to the storage device 110. This proves the storage device 110 knows the private key that corresponds to the public key that was sent with its device certificate.

For further confirmation, the host 400 may request a random challenge from the storage device 110. The storage device 110 encrypts a device random challenge with the host session key and sends this information to the host 400. The host 400 then decrypts the device random challenge with the host session key and encrypts the device random challenge with the device session key and sends this information back to the storage device 110. The storage device decrypts the device random challenge with the device session key and confirms it matches what was originally sent to the host 400. This proves the host 400 thus knows the private key that corresponds to the public key that was sent with the host's 400 certificate In one embodiment, the storage device 110 may use AES encryption with the host session key and host IV for secure messages to the host 400. The host 400 also uses AES encryption with a device session key and device IV for secure messages to the storage device 110.

Once the secure session has been established, session communications may be carried out using asymmetric or symmetric algorithms. In one embodiment, each secure message may include a header with a sequence number and message length, a body message AES encrypted with appropriate session key and IV, and a footer having a SHA-256 HMAC of message body. In one embodiment, session communications are established based on asymmetric encryption and then secured based on symmetric encryption. For example, once the secure session has been established, session communications may be carried out based on symmetric encryption, such as AES encryption and AES decryption with the session keys and IV's established. Each secure message may include a header with a sequence number and message length, a body message AES encrypted with appropriate session key and IV, and a footer having a SHA-256 HMAC of message body. In another embodiment, asymmetric encryption may be employed to secure traffic during the session, as well.

Second, now that secure channel has been established, the download server 300 requests the binding key from the storage device 110. In particular, the download server 300 may send a message via the secure channel to the storage device 110. As noted, in one embodiment, the binding key 606 is initially absent from the content's metadata and is generated when needed.

Third, the storage device 110 generates the binding key 606. In particular, the cryptographic module 409 generates the binding key 606 based on the unique key 602 and the concealed key 604.

In one embodiment, the cryptographic module 409 employs a one-way hash algorithm or an Advance Encryption Standard (AES) algorithm to generate the binding key, Kb, where:

$Kb=F(Kroot, IDm)$

Where F is a one-way function,

Kroot is a key generated by the cryptographic module 409, i.e., the concealed key 604, IDm is a unique media identifier number assigned during manufacture of the storage device 110, such as unique identifier 602.

Alternatively, the cryptographic module 409 may generate the binding key using a random number, such as from a random number generator, and inputting this random number into a key generator. The key generator may be software or a hardware component in the cryptographic module 409.

Fourth, the download server 300 requests from the key server 200 a content key for protecting the content. The content key may be assigned to the content in various ways. For example, the key server 200 may assign a content key that is unique to each item of content. In one embodiment, the content key 700 is provided as part of the content's metadata and stored on the storage device 110. The content key 700 may be cryptographically protected when sent to the host 400.

Fifth, the key server 200 provides the content key 700 to the download server 300. In particular, the key server 200 may establish a secure channel with the download server 300, for example, based on PKI.

Sixth, the download server 300 generates an access key 706 based on the binding key 606 and the content key 700. In particular, the download server 300 may employ a unique algorithm to cryptographically combine the binding key 606 and content key 700 and generate the access key 706, for example, based on a one-way hash algorithm. The unique algorithm may be known only to certain entities of the system 100, such as the download server 300 and trusted playback devices in client system 106. The algorithm may be a licensable or renewable function. In addition, one or more algorithms may be passed from the download server 300 to trusted components in client system 106 via a field or portion in the secure metadata of the content. For example, a set of multiple algorithms may be initially configured or established within trusted components of client system 106. The download server 300 may then provide a pointer or indicator in a content's secure metadata which of the set algorithms to employ when generating the access key.

In one embodiment, the access key 706 is not included in the content metadata nor is it stored on download server 300. For example, instead, the download server 300 may be configured to ephemerally generate the access key 706. Alternatively, information for generating the access key 706 may be archived to a secure remote storage by the download server 300. For example, the audit system 102 may serve as a secure repository for securely storing the binding key 606 and/or the content key 700.

Seventh, the download server 300 provides the content key 700 to the storage device 110. The storage device 110 then securely stores the content key 700. For example, the storage device 110 may store the content key 700 in the non-user area 506.

Eighth, the download server 300 encrypts all or portions of the content 702 into encrypted content 704. For example, the download server 300 may employ AES encryption to encrypt the content 702 based on the access key 706.

Ninth, the download server 300 provides the encrypted content 704 to the storage device 110. The storage device 110 may then store the encrypted content 704, for example, in its user area.

Figure 7A:
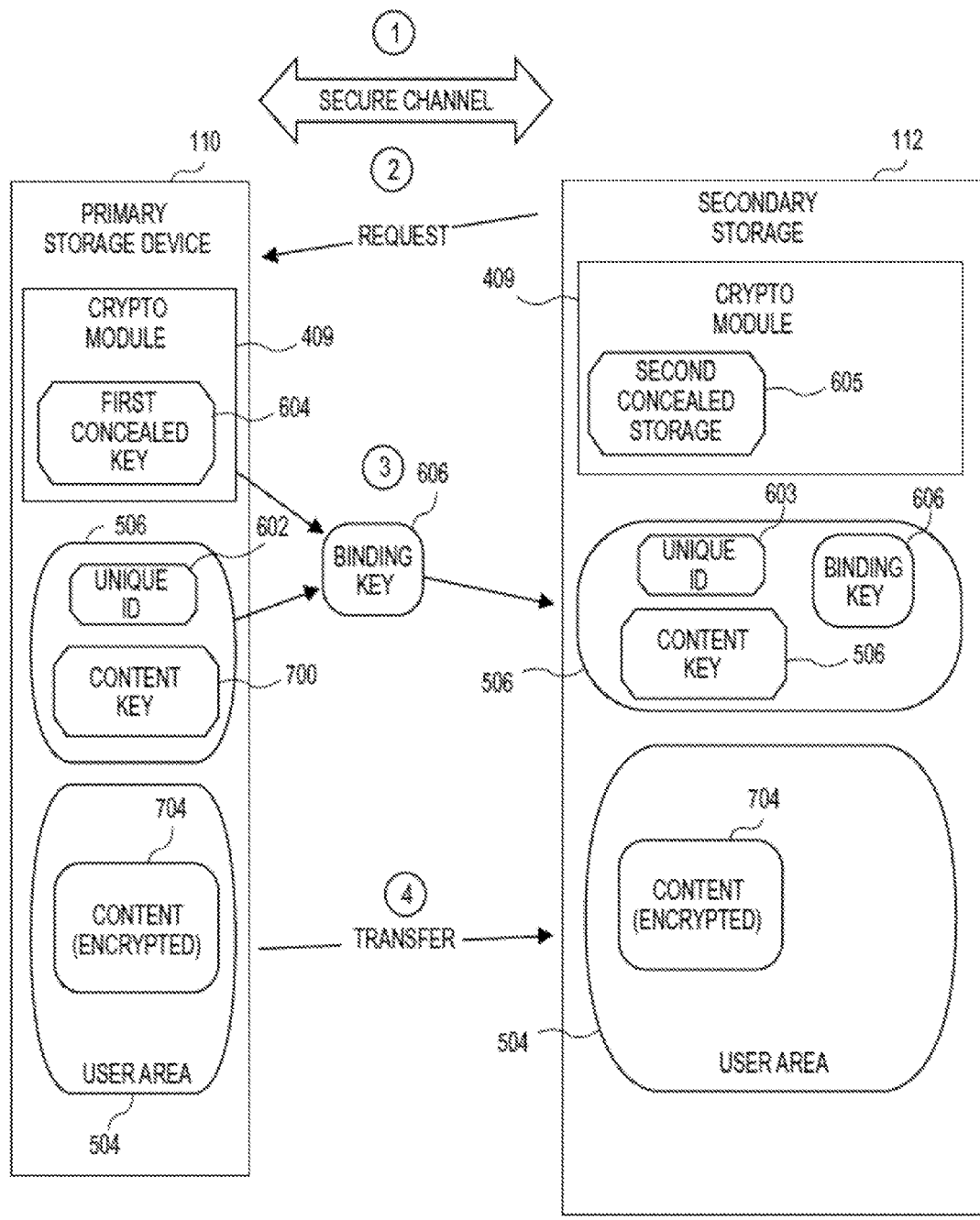
FIG. 7A illustrates an exemplary process flow for peer-to-peer copying or transferring content from a primary storage device to a secondary storage device according to one embodiment.

FIG. 7A illustrates an exemplary process flow for copying or transferring content from a primary storage device to a secondary storage device according to one embodiment. As shown, first, the storage device 110 and the secondary storage device 112 establish a secure communication channel with each other. For example, these entities may employ PKI to establish a secure communications channel with each other that is tunneled transparently through one or more host systems 400.

Once the secure session has been established, session communications may be carried out based on symmetric encryption, such as AES encryption and AES decryption with the session keys and IV's established. Each secure message may include a header with a sequence number and message length, a body message AES encrypted with appropriate session key and IV, and a footer having a SHA-256 HMAC of message body. In another embodiment, asymmetric encryption may be employed to secure traffic during the session, as well.

In one embodiment, the storage device 110 may use the host device 400 to proxy the secure channel through which it is transparently tunneled. For example, the storage device 110 may be a direct attached USB drive that is connected to a host. In this embodiment, the host provides a proxy for assisting in the establishment of the secure channel, but the secure channel is implemented as a secure tunnel through the host. For purposes of illustration, the tunneling through a host is omitted for sake of clarity of the figures.

Second, now that secure channels have been established, the primary storage device 110 and the secondary storage 112 each request permission to transfer or copy content. For example, the primary storage device 110 and secondary storage device 112 may each request permission from each other for the transfer of content. Secondary storage 112 and primary storage 110 may individually determine permission based on various criteria. In one embodiment, the storage devices 110 and 112 may analyze one or more digital certificates to determine authorization and access limits for transferring content and/or the content metadata.

Third, the storage device 110 generates the binding key 606. In particular, the cryptographic module 409 generates the binding key 606 based on the unique key 602 and the concealed key 604. Of note, this feature of the binding key 606 binding to the storage device 110 creates an ownership chain and forensic traceability of the content.

In addition, the secondary storage 112 may obtain the content key 700 from the storage device 110 as well. In one embodiment, the primary storage device 110 provides both the binding key 606 and the content key 700 to the secondary storage device 112. In one embodiment, the content key is sourced from primary storage 110.

In another embodiment, the secondary storage 112 obtains the content key 700 from another source, such as the trusted server 114, the download system 104, or the audit system 102. For example, the secondary storage 112 may be configured to establish a secure communication channel to one of these entities and request the content key 700. This request by the secondary storage 112 may also be confirmed or authorized by the trusted system 114. In one embodiment, the storage devices avoid the need for a third party or trusted system, and instead, establish a peer-to-peer secure connection. The peer-to-peer connection may be established in a variety of ways, including, for example, policy restrictions specified in one or more digital certificates for the storage devices 110 or 112, the content, etc.

Fourth, the primary storage device 110 may transfer the encrypted content 704 via the trusted server 114 and to the secondary storage 112. This transfer may be performed using known protocols for file transfer, streaming, etc. In one embodiment, the primary storage device 110 transfers secure metadata for the content 704 via the trusted server 114 to the secondary storage 112. The content 704 may then be transferred from the primary storage device 110 to the secondary storage 112 via the trusted server 114 or via a peer-to-peer connection between the primary storage device 110 and the second storage device 112.

Figure 7B:
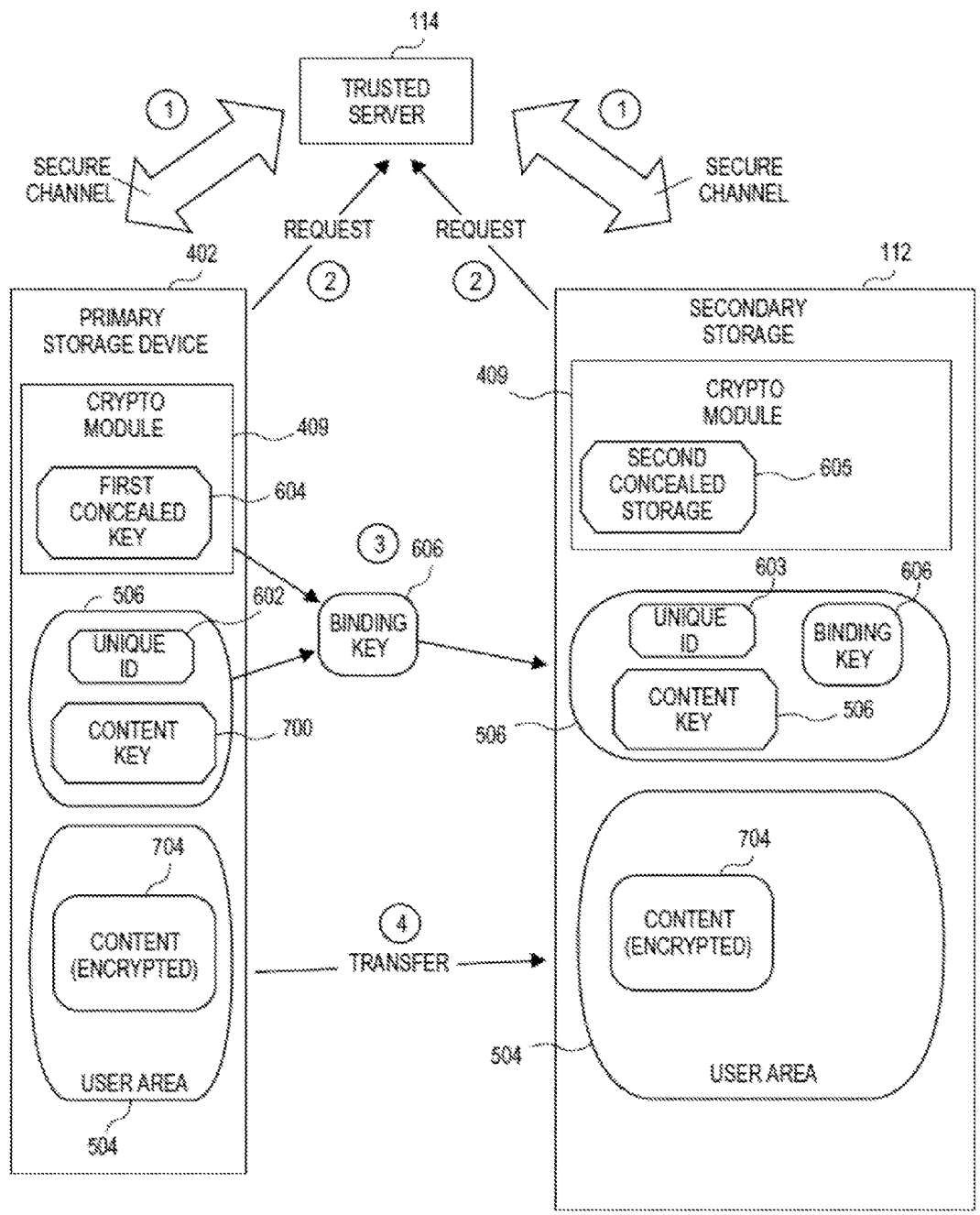
FIG. 7B illustrates an exemplary process flow for copying or transferring content from a primary storage device to a secondary storage device via a trusted server according to one embodiment.

FIG. 7B illustrates an exemplary process flow for copying or transferring content from a primary storage device to a secondary storage device via a trusted server according to one embodiment. As shown, first, the storage device 110 and the secondary storage device 112 establish a secure communication channel with the trusted server 114. For example, these entities may employ PKI to establish a secure communications channel with each other and the trusted server 114. The trusted server 114 may then control and supervise the transfer of content from the storage device 110 to the secondary storage device 112 as will be described below.

Once the secure session has been established, session communications may be carried out based on symmetric encryption, such as AES encryption and AES decryption with the session keys and IV's established. Each secure message may include a header with a sequence number and message length, a body message AES encrypted with appropriate session key and IV, and a footer having a SHA-256 HMAC of message body. In another embodiment, asymmetric encryption may be employed to secure traffic during the session, as well.

In one embodiment, the storage device 110 may use the host device 400 to proxy the secure channel through which is transparently tunneled. For example, the storage device 110 may be a direct attached USB drive that is connected to a host. In this embodiment, the host provides a proxy for assisting in the establishment of the secure channel, but the secure channel is implemented as a secure tunnel through the host. For purposes of illustration, the tunneling through a host is omitted for sake of clarity of the figures.

Second, now that secure channels have been established, the primary storage device 110 and the secondary storage 112 each request permission to transfer or copy content. For example, the primary storage device 110 and secondary storage device 112 may request permission from trusted server 114 to transfer content. Trusted server 114 may determine permission based on various criteria. In one embodiment, the trusted server 114 may analyze one or more digital certificates, such as the digital certificate of the storage devices 110 and 112 and the content.

Third, the storage device 110 generates the binding key 606. In particular, the cryptographic module 409 generates the binding key 606 based on the unique key 602 and the concealed key 604. Of note, this feature of the binding key 606 binding to the storage device 110 creates an ownership chain and forensic traceability of the content. For example, in one embodiment, the binding key 606 from the storage device 110 may be sent over a secure channel to the secondary storage device 112. The secondary storage device 112 may then encrypt the binding key 606 with its own concealed key, and thus, the binding key 606 of the primary storage device 110 is also cryptographically bound to the secondary storage device 112.

In addition, the secondary storage 112 may obtain the content key 700 from the storage device 110 as well. In one embodiment, the primary storage device 110 provides both the binding key 606 and the content key 700 to the secondary storage device 112.

In another embodiment, the secondary storage 112 obtains the content key 700 from another source, such as the trusted server 114, the download system 104, or the audit system 102. For example, the secondary storage 112 may be configured to establish a secure communication channel to one of these entities and request the content key 700. This request by the secondary storage 112 may also be confirmed or authorized by the trusted system 114.

Fourth, the primary storage device 110 may transfer the encrypted content 704 to the secondary storage 112. This transfer may be performed using known protocols for file transfer, streaming, etc. In one embodiment, the transfer of the content occurs directly between the primary storage device 110 and the secondary storage 112. In another embodiment, the transfer occurs via the trusted server 114. In another embodiment, the first storage 110 demonstrates ownership of the content. Then, the content is re-bound to the second storage 112 by generating a new binding key and transferring meta-data. In other words, the trusted server re-provisions the content to the secondary storage device.

Figure 8:
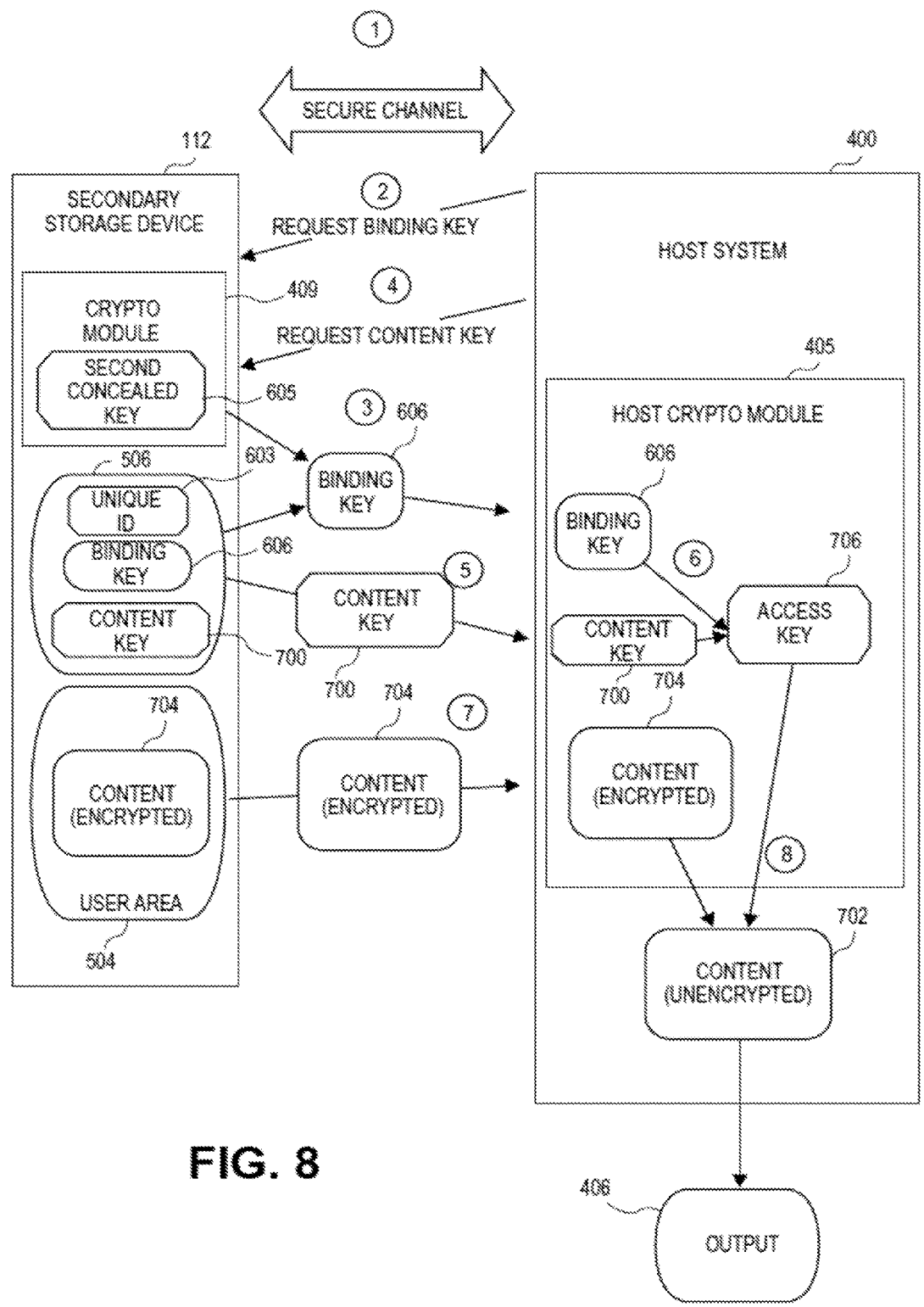
FIG. 8 illustrates an exemplary process flow for playing content from a secondary storage device according to one embodiment.

FIG. 8 illustrates an exemplary process flow for playing content from the secondary storage device 112 in accordance with one embodiment. As shown, first, the host system 400 and the secondary storage device 112 may establish a secure communication channel with each other. For purposes of brevity, an example of the establishment of a secure channel based on PKI was provided above with reference to FIG. 7. In one embodiment, the storage device 110 will evaluate content's digital certificate and the player certificate to determine eligibility of the player to receive the content and/or content metadata.

Second, the host system 400 requests the binding key 606 from the secondary storage device 112. Of note, in one embodiment, the storage device 112 securely retains the binding key 506 of the primary storage device 110 to which the content was originally provisioned. As noted, this feature may provide forensic information and ownership traceability of the content if needed, for example, for recovery, theft detection, etc.

Accordingly, third, the storage device 112 provides the binding key 606 of the primary storage device 110. In one embodiment, the secondary storage device 112 stores the binding key 606 in encrypted form within its secured storage area 506 and uses concealed key 605 from its cryptographic module 409. As noted above, this the binding key 606 of the primary storage device 110 is cryptographically bound to the secondary storage device 112.

Fourth, the host system 400 requests the content key 700 from the storage device 110. In one embodiment, the content key 700 may be retrieved from the content metadata stored in the non-user area on the storage device. In particular, the host system 400 may request or specify the content key 700 based on a variety of parameters, such as a content identifier, and the like.

Fifth, the storage device 110 provides the content key 700 to the host system 400. For example, the storage device 110 may access the non-user area 506 and transmit the content key 700 to the host system 400. When retrieving the content key 700, the cryptographic module 409 may need to perform various cryptographic functions, such as decryption, checking of digital signatures, etc.

Sixth, the host system 400 generates the access key 706 in order to decrypt the content. In particular, the host's cryptographic module 405 generates the access key 706 based on a cryptographic combination of the binding key 606 and the content key 700. The cryptographic module 405 is programmed with the unique algorithm that is known only within the cryptographic module 405. For example, the cryptographic module 405 of the host system 400 may comprise an OTP NVM that is programmed with the algorithm for generating the access key 706.

Seventh, the storage device 110 provides the encrypted content 704 to the host system 400. In one embodiment, the storage device 110 streams the encrypted content 704 to the host system 400.

Eighth, the host system 400 cryptographically processes the encrypted content 704 to recover the content 702 in unencrypted form. As noted, in one embodiment, content is encrypted based on symmetric cryptography, such as AES 128, using the access key 706. Once in decoded or unencrypted form, the host system 400 may then output the content 702 to an output 406. Of note, the host system 400 may re-encrypt the content for delivery to the output 406. For example, if the output 406 is a high definition multimedia interface ("HDMI") device, then host 400 may re-encrypt the content using High-bandwidth Digital Content Protection ("HDCP") encryption currently specified for HDMI devices and transmit the content in this secure form. In one embodiment, the host 400 may decrypt the content and then re-encrypt the content using a secure transport encryption protocol, such as high bandwidth content protocol (HDCP), and outputting the re-encrypted content to a display device, such as TV, a monitor, etc. In another embodiment, the host 400 decrypts the content, then re-encrypts the content using, for example, digital transmission content protection (DTCP), and sends the re-encrypted content to a playback device, such as a TV, a monitor, etc. Accordingly, in one embodiment, the content may always in a secured form when in transit between entities of the system 100.

Figure 7C:
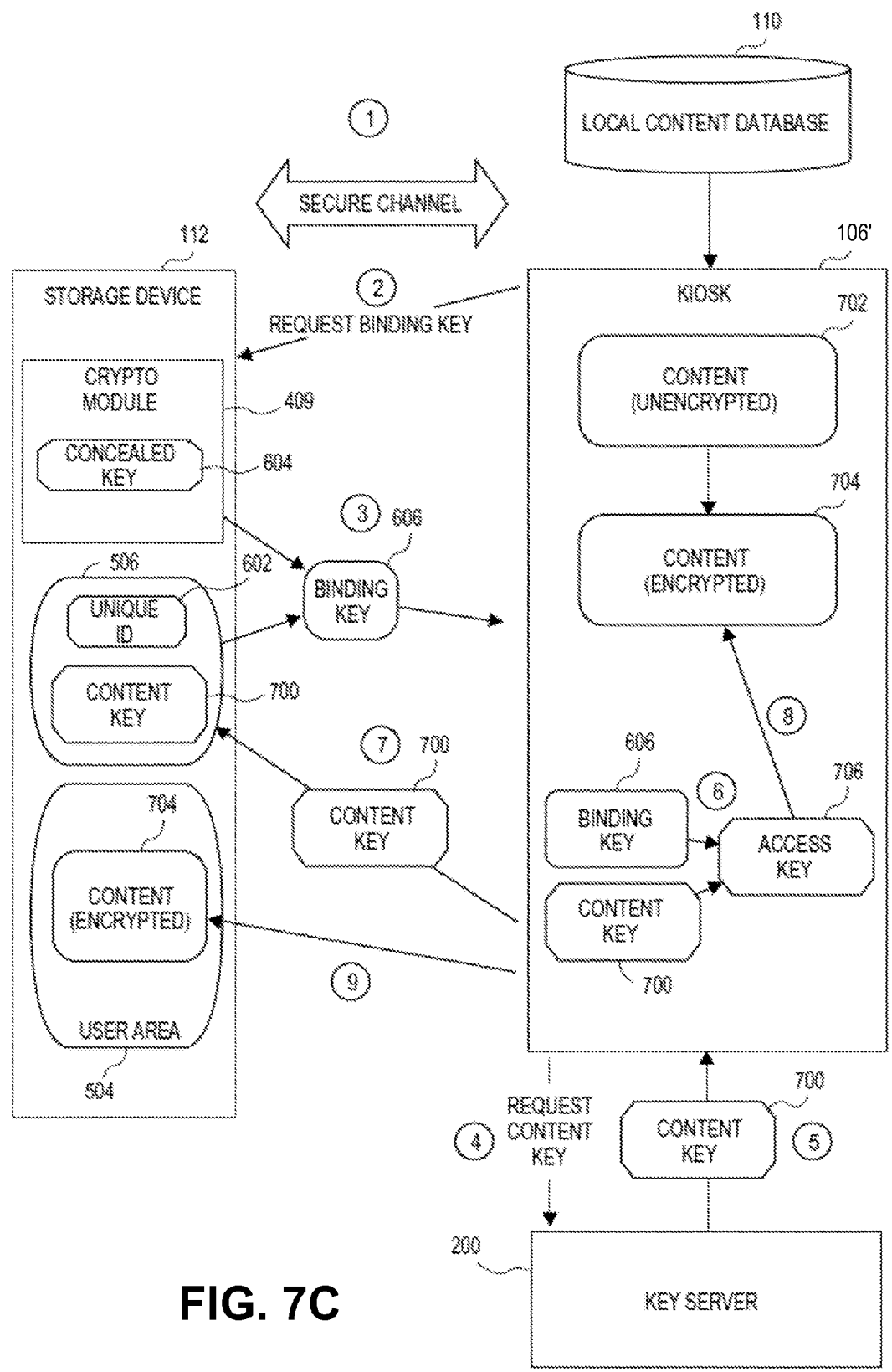
FIG. 7C illustrates an exemplary process flow for provisioning content from a kiosk to a storage device according to one embodiment.

FIG. 7C illustrates an exemplary process flow for provisioning content from the kiosk to a storage device. In this embodiment, revocability and renewability are attributes of the DRM system. As an additional security system component, the process flow illustrated may comprise various renewability features. For example, keys may be retired or random keys pre-generated can be used with a secure allocation algorithm that can either be varied from time to time or which makes use of multiple keys in a random fashion for each item of content to be provisioned to the storage device 112. For example, the embodiments may utilize tokenizing of an update file that could be suitable for all players.

As shown, first, the storage device 112 and the kiosk 106 establish a secure communication channel with each other. As noted, the communication may be conducted over a wired interface, such as a USB 3.0 interface, or a wireless interface, such as WiFi, 3G, 4G, etc. For example, the kiosk 106 and the storage device 112 may employ PKI to establish a secure communications channel. In particular, the kiosk 106 may request a certificate from the storage device 112. The storage device 112 may retrieve its certificate, for example, from its non-user area 506 in media 510. The storage device 112 may then send a device session ID and its certificate. The certificate includes its public key; $Public_{Device}$.

Kiosk 106 verifies the certificate. For example, the kiosk 106 may check the signature on the certificate. Kiosk 106 may also checks its revocation list to make sure the certificate from storage device 112 is not revoked. Alternatively, kiosk 106 may communicate over network 108 with audit system 102 and certificate authority 204 to verify the certificate and check revocation status of the certificate.

Kiosk 106 then responds by sending a host session ID and its certificate, which includes its public key, $Public_{Host}$, to storage device 112. The storage device 112 verifies the host certificate and checks the signature. The storage device 112 may also check its revocation list to make sure the kiosk 106 is not revoked.

Next, the kiosk 106 requests a session key from the storage device 112. In response, in one embodiment, the storage device 112 encrypts a random session key, a random device initialization vector ("IV"), and random device hash-based message authentication code ("HMAC") key with $Public_{Host}$, and sends it to kiosk 106.

Kiosk 106 decrypts the information with $Private_{Host}$ to recover the device session key, the device IV, and the device HMAC key. Kiosk 106 encrypts a random host session key, a random host IV, and random host HMAC key with $Public_{Device}$, and sends this information to storage device 112. The storage device 112 then decrypts this information with $Private_{Device}$, to recover the kiosk's session key, host IV, and host HMAC key.

The kiosk 106 may also encrypt a random challenge with the device session key and sends it to the storage device 112. The storage device 112 decrypts the host random challenge with the device session key, and then encrypts the host random challenge with the host session key, and sends this information back to the kiosk 106. The kiosk 106 decrypts the host random challenge with the host session key and confirms it matches what was originally sent to the storage device 112. This proves the storage device 112 knows the private key that corresponds to the public key that was sent with its device certificate.

For further confirmation, the kiosk 106 may request a random challenge from the storage device 112. The storage device 112 encrypts a device random challenge with the host session key and sends this information to the kiosk 106. The kiosk 106 then decrypts the device random challenge with the host session key and encrypts the device random challenge with the device session key and sends this information back to the storage device 112. The storage device decrypts the device random challenge with the device session key and confirms it matches what was originally sent to the kiosk 106. This proves the kiosk 106 thus knows the private key that corresponds to the public key that was sent with the kiosk's certificate In one embodiment, the storage device 112 may use AES encryption with the kiosk session key and host IV for secure messages to the kiosk 106. The kiosk 106 also uses AES encryption with a device session key and device IV for secure messages to the storage device 112.

Once the secure session has been established, session communications may be carried out using symmetric algorithms. In one embodiment, each secure message may include a header with a sequence number and message length, a body message AES encrypted with appropriate session key and IV, and a footer having a SHA-256 HMAC of message body. In another embodiment, session communications are established based on asymmetric encryption and then secured based on symmetric encryption. For example, once the secure session has been established, session communications may be carried out based on symmetric encryption, such as AES encryption and AES decryption with the session keys and IV's established. Each secure message may include a header with a sequence number and message length, a body message AES encrypted with appropriate session key and IV, and a footer having a SHA-256 HMAC of message body. In another embodiment, asymmetric encryption may be employed to secure traffic during the session, as well.

Second, now that secure channel has been established, the download kiosk 106 may request the binding key from the storage device 112. In particular, the kiosk 106 may send a message via the secure channel to the storage device 112. As noted, in one embodiment, the binding key 606 is initially absent from the content's metadata provided by the kiosk 106, and instead, is generated when needed.

Third, the storage device 112 generates the binding key 606. In particular, the cryptographic module 409 generates the binding key 606 based on the unique key 602 and the concealed key 604.

In one embodiment, the cryptographic module 409 employs a one-way hash algorithm or an Advance Encryption Standard (AES) algorithm to generate the binding key, Kb, where:

Kb=F(Kroot, IDm)

Where F is a one-way function,

Kroot is a key generated by the cryptographic module 409, i.e., the concealed key 604, IDm is a unique media identifier number assigned during manufacture of the storage device 112, such as unique identifier 602.

Fourth, the kiosk 106 may request from the key server 200 a content key for protecting the content. The content key may be assigned to the content in various ways. For example, the key server 200 may assign a content key that is unique to each item of content. In one embodiment, the content key is provided as part of the content's metadata and stored on the storage device.

Fifth, the key server 200 provides a content key 700 to the kiosk 106. In particular, the kiosk 106 may establish a secure channel with the download server 300, for example, based on PKI.

Sixth, the kiosk 106 generates an access key 706 based on the binding key 606 and the content key 700. In particular, the download server 300 may employ a unique algorithm to cryptographically combine the binding key 606 and content key 700 and generate the access key 706, for example, based on a one-way hash algorithm. The unique algorithm may be known only to certain entities of the system 100, such as the kiosk 106 and trusted playback devices in host 400.

In one embodiment, the kiosk 106 may be configured to ephemerally generate the access key 706 such that it is not stored on the kiosk 106. Alternatively, information for generating the access key 706 may be archived to a secure remote storage by the kiosk 106. For example, the audit system 102 may serve as a secure repository for securely storing the binding key and/or the content key.

Seventh, the kiosk 106 provides the content key 700 to the storage device 112. The storage device 112 then securely stores the content key 700. For example, the storage device 112 may store the content key 700 in the non-user area 506.

Eighth, the kiosk 106 encrypts all or portions of the content 702 into encrypted content 704. For example, the kiosk 106 may employ AES encryption to encrypt the content 702 based on the access key 706.

Ninth, the kiosk 106 provides the encrypted content 704 to the storage device 112. The storage device 112 may then store the encrypted content 704.

FIG. 8 illustrates an exemplary process flow for playing content. As shown, first, the host system 400 and the storage device 112 may establish a secure communication channel with each other. For purposes of brevity, an example of the establishment of a secure channel based on PKI was provided above with reference to FIG. 7.

Second, the host system 400 requests the binding key 606 from the storage device 112 because it is absent from the content metadata. Of note, in one embodiment, the storage device 112 does not retain the binding key 606. In another embodiment, the host system 400 requests for the binding key 606 are specific to the content to be played. This allows, for example, the storage device 112 to employ different algorithms for generating the binding key 606. The algorithms used may depend on various criteria, such as the specific item of content, the type of content, source of the content, number of copies of the content, etc.

Accordingly, third, the storage device 112 ephemerally generates the binding key 606. In particular, as noted above, cryptographic module 409 generates the binding key 606 based on a cryptographic combination of the concealed key 604 and the unique identifier 602. Once generated, the storage device 112 may transmit the binding key 606 to the host system 400.

Fourth, the host system 400 requests the content key 700 from the storage device 112. In one embodiment, the content key 700 may be retrieved from the content metadata stored in non-user area 506 on storage device 402. The host system 400 may specify the content key 700 based on a variety of parameters, such as a content identifier, and the like.

Fifth, the storage device 112 provides the content key 700 to the host system 400. For example, the storage device 112 may access the non-user area 506 and transmit the content key 700 to the host system 400. When retrieving the content key 700, the cryptographic module 409 may need to perform various cryptographic functions, such as decryption, checking of digital signatures, etc.

Sixth, the host system 400 generates the access key 706 in order to decrypt the content. In particular, the host's cryptographic module 405 generates the access key 706 based on a cryptographic combination of the binding key 606 and the content key 700. The cryptographic module 405 may be programmed with the unique algorithm that is known only within the cryptographic module 405. For example, the cryptographic module 405 may comprise an OTP NVM that is programmed with the algorithm for generating the access key 706. This feature allows, among other things, the access key 706 to be substantially absent from the content metadata.

Seventh, the storage device 112 provides the encrypted content 704 to the host system 400. In one embodiment, the storage device 112 streams the encrypted content 704 to the host system 400.

Eighth, the host system 400 cryptographically processes the encrypted content 704 to recover the content 702 in unencrypted form. As noted, in one embodiment, content is encrypted based on symmetric cryptography, such as AES 128, using the access key 706. Once in decoded or unencrypted form, the host system 400 may then output the content 702 to an output 406. Of note, the host system 400 may re-encrypt the content for delivery to the output 406. For example, if the output 406 is a high definition multimedia interface ("HDMI") device, then host 400 may re-encrypt the content using High-bandwidth Digital Content Protection ("HDCP") encryption currently specified for HDMI devices and transmit the content in this secure form. In one embodiment, the host 400 may decrypt the content and then re-encrypt the content using a secure transport encryption protocol, such as high bandwidth content protocol (HDCP), and outputting the re-encrypted content to a display device, such as TV, a monitor, etc. In another embodiment, the host 400 decrypts the content, then re-encrypts the content using, for example, digital transmission content protection (DTCP), and sends the re-encrypted content to a playback device, such as a TV, a monitor, etc. Accordingly, in one embodiment, the content may always be in a secured form when in transit between entities of the system 100.

The features and attributes of the specific embodiments disclosed above may be combined in different ways to form additional embodiments, all of which fall within the scope of the present disclosure. For example, in the case of Network Attached Storage (NAS), the NAS storage may contain one or more storage devices and implement various technologies (like RAID), which result in content that may be spread across multiple storage devices. In the case of a NAS comprising a single drive, the NAS controller may be configured to bind the content to the storage device of the single drive in similar fashion described above. In the case of a NAS comprising multiple drives, the content may be bound to the NAS subsystem instead of or in addition to a specific storage device or storage medium. Accordingly, the NAS subsystem may contain a secure cryptographic module. In this variation of the embodiments, for a NAS storage, a unique set of keys may be generated by the NAS controller and securely stored in the secure storage of the NAS. Then, content binding to the NAS may be performed in similar fashion as described above. Thus, even if a clone copy of a drive is accomplished, this drive will not be usable unless it is installed into exactly the same NAS system. This method may be useful in enabling replacement of a damaged drive in a NAS RAID system, while ensuring that a cloned drive is not useful.

Although the present disclosure provides certain embodiments and applications, other embodiments that are apparent to those of ordinary skill in the art, including embodiments, which do not provide all of the features and advantages set forth herein, are also within the scope of this disclosure. Accordingly, the scope of the present disclosure is intended to be defined only by reference to the appended claims.

What is claimed is:

1. A kiosk for provisioning secure media content to a plurality of portable data storage devices, the kiosk comprising:
   a first data interface configured to communicate with a portable data storage device;
   a second data interface configured to communicate, over a network, with a remote trusted server; and
   a processor configured to:
      obtain a unique identifier from the portable data storage device, wherein the unique identifier is specific to the portable data storage device and is concealed by the portable data storage device;
      authenticate the portable data storage device, using at least the unique identifier, by communicating with the remote trusted server over the second data interface; and
      in response to the authentication, provide to the portable data storage device an encrypted first media content and a corresponding access key.

2. The kiosk of claim 1, further comprising a local data storage storing a plurality of encrypted media content.

3. The kiosk of claim 2, further comprising a user interface for receiving a selection of the first media content from the local data storage, wherein the selection causes the kiosk to provide the encrypted first media content to the portable data storage device.

4. The kiosk of claim 1, wherein the portable data storage device comprises:
 a user area for storing the encrypted first media content that is accessible by a playback device; and
 a non-user area for storing cryptographic data that is not accessible by the playback device.

5. The kiosk of claim 1, wherein the first data interface is a USB interface.

6. The kiosk of claim 1, wherein the second data interface is a network interface.

7. The kiosk of claim 1, wherein the access key is an ephemeral key that is not stored on the kiosk after being generated.

8. The kiosk of claim 1, wherein the kiosk is located in a public environment.

9. A method for provisioning secure media content to a plurality of portable data storage devices from a kiosk, the method comprising:
 establishing communications with a portable data storage device over a first data interface;
 establishing communications with a remote trusted server via a second data interface over a network;
 obtaining a unique identifier from the portable data storage device, wherein the unique identifier is specific to the portable data storage device and is concealed by the portable data storage device;
 authenticating the portable data storage device, using at least the unique identifier, by communicating with the remote trusted server over the second data interface; and
 in response to the authentication, providing to the portable data storage device an encrypted first media content and a corresponding access key.

10. The method of claim 9, wherein the kiosk comprises a local data storage storing a plurality of encrypted media content.

11. The method of claim 10, further comprising:
 receiving, on a user interface, a selection of the first media content from the local data storage; and
 in response to the selection, providing the encrypted first media content to the portable data storage device.

12. The method of claim 9, wherein the first data interface is a USB interface.

13. The method of claim 9, wherein the second data interface is a network interface.

14. The method of claim 9, wherein the access key is an ephemeral key that is not stored on the kiosk after being generated.

15. The method of claim 9, further comprising authorizing copying of the content based on at least one of a digital certificate or a permission specified in secure metadata of the content.

16. The method of claim 9, further comprising encrypting a digital certificate and storing the encrypted digital certificate in a secure area of the portable data storage device.

17. The method of claim 9, wherein the kiosk is located in a public environment.

* * * * *